(12) United States Patent
Loetgering et al.

(10) Patent No.: US 12,474,267 B2
(45) Date of Patent: Nov. 18, 2025

(54) WAVEFRONT METROLOGY SENSOR AND MASK THEREFOR, METHOD FOR OPTIMIZING A MASK AND ASSOCIATED APPARATUSES

(71) Applicant: ASML Netherlands B.V., Veldhoven (NL)

(72) Inventors: Lars Loetgering, Amsterdam (NL); Stefan Michiel Witte, Hoofddorp (NL); Christina Lynn Porter, Veldhoven (NL); Petrus Wilhelmus Smorenburg, Veldhoven (NL)

(73) Assignee: ASML Netherlands B.V., Veldhoven (NL)

( * ) Notice: Subject to any disclaimer, the term of this patent is extended or adjusted under 35 U.S.C. 154(b) by 253 days.

(21) Appl. No.: 18/043,794

(22) PCT Filed: Aug. 16, 2021

(86) PCT No.: PCT/EP2021/072720
§ 371 (c)(1),
(2) Date: Mar. 2, 2023

(87) PCT Pub. No.: WO2022/048899
PCT Pub. Date: Mar. 10, 2022

(65) Prior Publication Data
US 2023/0341325 A1    Oct. 26, 2023

(30) Foreign Application Priority Data

Sep. 2, 2020   (EP) .................................... 20194153

(51) Int. Cl.
*G01N 21/47* (2006.01)
*G01J 1/04* (2006.01)
(Continued)

(52) U.S. Cl.
CPC ........ *G01N 21/4788* (2013.01); *G01J 1/0437* (2013.01); *G01J 1/4257* (2013.01);
(Continued)

(58) Field of Classification Search
CPC .......... G01J 1/0437; G01J 1/4257; G01J 9/00; G01N 21/4788; G01N 23/20025;
(Continued)

(56) References Cited

U.S. PATENT DOCUMENTS 6,924,899 B2   8/2005   Hutchin et al.
6,952,253 B2   10/2005  Lof et al.
(Continued)

FOREIGN PATENT DOCUMENTS

CN    101105639 A    1/2008
CN    101126836 A    2/2008
(Continued)

OTHER PUBLICATIONS

International Search Report and Written Opinion of the International Searching Authority directed to International Patent Application No. PCT/EP2021/072720, mailed Oct. 22, 2021; 13 pages.
(Continued)

*Primary Examiner* — Mark R Gaworecki
(74) *Attorney, Agent, or Firm* — Sterne, Kessler, Goldstein & Fox P.L.L.C.

(57) ABSTRACT

Disclosed is a wavefront sensor for measuring a wavefront of a radiation. The wavefront sensor comprises a mask comprising a pattern located in path of the radiation to interact with the radiation. The radiation impinging on the mask forms a radiation detection pattern on a radiation detector subsequent to the mask, and the pattern of the mask is designed at least partly based on a requirement of the radiation detection pattern.

19 Claims, 7 Drawing Sheets

(51) Int. Cl.

| | | |
|---|---|---|
| *G01J 1/42* | (2006.01) | |
| *G01J 9/00* | (2006.01) | |
| *G01N 23/20* | (2018.01) | |
| *G01N 23/20025* | (2018.01) | |
| *G01N 23/2055* | (2018.01) | |
| *G03F 7/00* | (2006.01) | |

(52) U.S. Cl.
CPC .......... *G01J 9/00* (2013.01); *G01N 23/20025* (2013.01); *G01N 23/2055* (2013.01); *G03F 7/70616* (2013.01); *G03F 7/70625* (2013.01); *G03F 7/70633* (2013.01); *G03F 7/70681* (2023.05); *G01N 2201/021* (2013.01)

(58) Field of Classification Search
CPC .......... G01N 23/2055; G01N 2201/021; G03F 7/70616; G03F 7/70625; G03F 7/70633; G03F 7/70681
See application file for complete search history.

(56) References Cited

U.S. PATENT DOCUMENTS

| | | | |
|---|---|---|---|
| 6,961,116 | B2 | 11/2005 | Den Boef et al. |
| 7,265,364 | B2 | 9/2007 | Teunissen et al. |
| 7,301,613 | B2 | 11/2007 | Levecq et al. |
| 7,388,652 | B2 | 6/2008 | Van Der Sijs et al. |
| 7,646,471 | B2 | 1/2010 | Teunissen et al. |
| 7,701,577 | B2 | 4/2010 | Straaijer et al. |
| 7,791,724 | B2 | 9/2010 | Den Boef et al. |
| 8,115,926 | B2 | 2/2012 | Straaijer |
| 8,553,227 | B2 | 10/2013 | Jordanoska |
| 8,681,312 | B2 | 3/2014 | Straaijer |
| 8,692,994 | B2 | 4/2014 | Straaijer |
| 8,792,096 | B2 | 7/2014 | Straaijer |
| 8,797,554 | B2 | 8/2014 | Straaijer |
| 8,823,922 | B2 | 9/2014 | Den Boef |
| 9,335,206 | B2 | 5/2016 | Zhang et al. |
| 10,061,206 | B2 | 8/2018 | Bittner et al. |
| 10,191,391 | B2 | 1/2019 | Pandey et al. |
| 10,337,850 | B2 | 7/2019 | Hetzler et al. |
| 10,386,728 | B2 | 8/2019 | Wegmann |
| 2002/0001088 | A1 | 1/2002 | Wegmann et al. |
| 2006/0066855 | A1 | 3/2006 | Boef et al. |
| 2007/0224518 | A1 | 9/2007 | Yokhin et al. |
| 2010/0233600 | A1 | 9/2010 | Den Boef et al. |
| 2010/0328655 | A1 | 12/2010 | Den Boef |
| 2011/0026032 | A1 | 2/2011 | Den Boef et al. |
| 2011/0102753 | A1 | 5/2011 | Van De Kerkhof et al. |
| 2011/0249244 | A1 | 10/2011 | Leewis et al. |
| 2012/0044470 | A1 | 2/2012 | Smilde et al. |
| 2013/0162996 | A1 | 6/2013 | Straaijer et al. |
| 2013/0182264 | A1 | 7/2013 | Hetzler et al. |
| 2013/0304424 | A1 | 11/2013 | Bakeman et al. |
| 2014/0019097 | A1 | 1/2014 | Bakeman et al. |
| 2015/0153651 | A1 | 6/2015 | Feng et al. |
| 2015/0261097 | A1 | 9/2015 | Mathijssen et al. |
| 2016/0161863 | A1 | 6/2016 | Den Boef et al. |
| 2016/0282282 | A1 | 9/2016 | Quintanilha et al. |
| 2016/0370717 | A1 | 12/2016 | Den Boef et al. |
| 2017/0184455 | A1 | 6/2017 | Wang et al. |
| 2017/0184981 | A1 | 6/2017 | Quintanilha et al. |
| 2017/0269480 | A1 | 9/2017 | Finders |
| 2018/0073992 | A1* | 3/2018 | Van Voorst ......... G03F 7/70616 |

FOREIGN PATENT DOCUMENTS

| | | |
|---|---|---|
| CN | 101515105 B | 7/2010 |
| CN | 102419213 A | 4/2012 |
| CN | 107636510 A | 1/2018 |
| CN | 107646087 A | 1/2018 |
| CN | 108431694 A | 8/2018 |
| CN | 108955905 A | 12/2018 |
| EP | 1 123 491 A1 | 8/2001 |
| EP | 1 628 164 A2 | 2/2006 |
| EP | 3 410 211 A1 | 12/2018 |
| NL | 2024478 A | 1/2020 |
| TW | 201414996 A | 4/2014 |
| TW | I616642 B | 3/2018 |
| WO | WO 00/17612 A1 | 3/2000 |
| WO | WO 03/102499 A1 | 12/2003 |
| WO | WO 2004/051206 A1 | 6/2004 |
| WO | WO 2011/012624 A1 | 2/2011 |
| WO | WO 2016/102127 A1 | 6/2016 |
| WO | WO 2018/219585 A1 | 12/2018 |

OTHER PUBLICATIONS

International Preliminary Report on Patentability directed to International Patent Application No. PCT/EP2021/072720, issued Mar. 7, 2023; 9 pages.

Austin et al., "Lateral shearing interferometry of high-harmonic wavefronts," Optics Letters, vol. 36, No. 10, May 15, 2011; pp. 1746-1748.

Braig et al., "An EUV beamsplitter based on conical grazing incidence diffraction," Optics Express, vol. 20, No. 2, Jan. 16, 2012; pp. 1825-1838.

Frumker et al., "Frequency-resolved high-harmonic wavefront characterization," Optics Letters, vol. 34, No. 19, Oct. 1, 2009; pp. 3026-3028.

Gardner et al., "Subwavelength coherent imaging of periodic samples using a 13.5 nm tabletop high-harmonic light source," Nature Photonics, vol. 11, Mar. 20, 2017; pp. 259-264.

Künzel et al., "Shot-to-shot intensity and wavefront stability of high-harmonic generation," Applied Optics, vol. 54, No. 15, May 20, 2015; pp. 4745-4749.

Lemaillet et al., "Intercomparison between optical and x-ray scatterometry measurements of FinFET structures," Proc. of SPIE, vol. 8681, Metrology, Inspection, and Process Control for Microlithography XXVII, Apr. 10, 2013; 8 pages.

Ling et al., "Quadriwave lateral shearing interferometer based on a randomly encoded hybrid grating," Optics Letters, vol. 40, No. 10, May 15, 2015; pp. 2245-2248.

Mercère et al., "Hartmann wave-front measurement at 13.4 nm with euv/120 accuracy," Optics Letters, vol. 28, No. 17, Sep. 1, 2003; pp. 1534-1536.

Naulleau et al., "Extreme-ultraviolet phase-shifting point-diffraction interferometer: a wave-front metrology tool with subangstrom reference-wave accuracy," Applied Optics, vol. 38, No. 35, Dec. 10, 1999; pp. 7252-7263.

Porter et al., "General-purpose, wide field-of-view reflection imaging with a tabletop 13 nm light source," Optica, vol. 4, No. 12, Dec. 2017; pp. 1552-1557.

Soloviev et al., "Hartmann-Shack test with random masks for modal wavefront reconstruction," Optics Express, vol. 13, No. 23, Nov. 14, 2005; pp. 9570-9584.

Subedi et al., "Coronagraph-integrated wavefront sensing with a sparse aperture mask," Journal of Astronomical Telescopes, Instruments, and Systems, vol. 1. No. 3, Jun. 12, 2015; pp. 1-12.

Thibault et al., "High-Resolution Scanning X-ray Diffraction Microscopy," Science, vol. 321, No. 5887, Jul. 18, 2008; 10 pages.

C. E. Shannon, "A Mathematical Theory of Communication," The Bell System Technical Journal, vol. 27, No. 3, Jul. 1948; 55 pages.

* cited by examiner

WAVEFRONT METROLOGY SENSOR AND MASK THEREFOR, METHOD FOR OPTIMIZING A MASK AND ASSOCIATED APPARATUSES

CROSS REFERENCE TO RELATED APPLICATIONS

This application claims priority of EP Application Serial No. 20194153.1 which was filed on 2020-Sep-02 and which is incorporated herein in its entirety by reference.

FIELD

The present invention relates to wavefront metrology such as used in combination with ptychography to monitor a radiation source.

BACKGROUND

A lithographic apparatus is a machine constructed to apply a desired pattern onto a substrate. A lithographic apparatus can be used, for example, in the manufacture of integrated circuits (ICs). A lithographic apparatus may, for example, project a pattern (also often referred to as "design layout" or "design") at a patterning device (e.g., a mask) onto a layer of radiation-sensitive material (resist) provided on a substrate (e.g., a wafer).

To project a pattern on a substrate a lithographic apparatus may use electromagnetic radiation. The wavelength of this radiation determines the minimum size of features which can be formed on the substrate. Typical wavelengths currently in use are 365 nm(i-line), 248 nm, 193 nm and 13.5 nm. A lithographic apparatus, which uses extreme ultraviolet (EUV) radiation, having a wavelength within the range 4-20 nm, for example 6.7 nm or 13.5 nm, may be used to form smaller features on a substrate than a lithographic apparatus which uses, for example, radiation with a wavelength of 193 nm.

Low-$k_1$ lithography may be used to process features with dimensions smaller than the classical resolution limit of a lithographic apparatus. In such process, the resolution formula may be expressed as $CD=k_1 \times \lambda/NA$, where $\lambda$ is the wavelength of radiation employed, NA is the numerical aperture of the projection optics in the lithographic apparatus, CD is the "critical dimension" (generally the smallest feature size printed, but in this case half-pitch) and $k_1$ is an empirical resolution factor. In general, the smaller $k_1$ the more difficult it becomes to reproduce the pattern on the substrate that resembles the shape and dimensions planned by a circuit designer in order to achieve particular electrical functionality and performance. To overcome these difficulties, sophisticated fine-tuning steps may be applied to the lithographic projection apparatus and/or design layout. These include, for example, but not limited to, optimization of NA, customized illumination schemes, use of phase shifting patterning devices, various optimization of the design layout such as optical proximity correction (OPC, sometimes also referred to as "optical and process correction") in the design layout, or other methods generally defined as "resolution enhancement techniques" (RET). Alternatively, tight control loops for controlling a stability of the lithographic apparatus may be used to improve reproduction of the pattern at low $k_1$.

In lithographic processes, it is desirable frequently to make measurements of the structures created, e.g., for process control and verification. Various tools for making such measurements are known, including scanning electron microscopes, which are often used to measure critical dimension (CD), and specialized tools to measure overlay, the accuracy of alignment of two layers in a device. Recently, various forms of scatterometers have been developed for use in the lithographic field.

Examples of known scatterometers often rely on provision of dedicated metrology targets. For example, a method may require a target in the form of a simple grating that is large enough that a measurement beam generates a spot that is smaller than the grating (i.e., the grating is underfilled). In so-called reconstruction methods, properties of the grating can be calculated by simulating interaction of scattered radiation with a mathematical model of the target structure. Parameters of the model are adjusted until the simulated interaction produces a diffraction pattern similar to that observed from the real target.

In addition to measurement of feature shapes by reconstruction, diffraction-based overlay can be measured using such apparatus, as described in published patent application US2006066855A1. Diffraction-based overlay metrology using dark-field imaging of the diffraction orders enables overlay measurements on smaller targets. These targets can be smaller than the illumination spot and may be surrounded by product structures on a wafer. Examples of dark field imaging metrology can be found in numerous published patent applications, such as for example US2011102753A1 and US20120044470A. Multiple gratings can be measured in one image, using a composite grating target. The known scatterometers tend to use light in the visible or near-infrared (IR) wave range, which requires the pitch of the grating to be much coarser than the actual product structures whose properties are actually of interest. Such product features may be defined using deep ultraviolet (DUV), extreme ultraviolet (EUV) or X-ray radiation having far shorter wavelengths. Unfortunately, such wavelengths are not normally available or usable for metrology.

On the other hand, the dimensions of modern product structures are so small that they cannot be imaged by optical metrology techniques. Small features include for example those formed by multiple patterning processes, and/or pitch-multiplication. Hence, targets used for high-volume metrology often use features that are much larger than the products whose overlay errors or critical dimensions are the property of interest. The measurement results are only indirectly related to the dimensions of the real product structures, and may be inaccurate because the metrology target does not suffer the same distortions under optical projection in the lithographic apparatus, and/or different processing in other steps of the manufacturing process. While scanning electron microscopy (SEM) is able to resolve these modern product structures directly, SEM is much more time consuming than optical measurements. Moreover, electrons are not able to penetrate through thick process layers, which makes them less suitable for metrology applications. Other techniques, such as measuring electrical properties using contact pads is also known, but it provides only indirect evidence of the true product structure.

By decreasing the wavelength of the radiation used during metrology, it is possible to resolve smaller structures, to increase sensitivity to structural variations of the structures and/or penetrate further into the product structures. One such method of generating suitably high frequency radiation (e.g. hard X-ray, soft X-ray and/or EUV radiation) may be using a pump radiation (e.g., infra-red radiation) to excite a generating medium, thereby generating an emitted radiation, optionally a high harmonic generation comprising high frequency radiation.

Wavefront metrology sensors, or called wavefront sensors, is for measuring a wavefront of a radiation and may use a mask comprising a pattern located in the path of the radiation such as a Hartmann mask. Such masks are not optimal for wavefront sensing, particularly in terms of wavefront and spectral sensitivity, especially when used in combination with ptychography. It would be desirable to improve on such masks.

SUMMARY

In a first aspect of the invention, there is provided a wavefront sensor for measuring a wavefront of a radiation. The wavefront sensor comprises: a mask comprising a pattern located in path of the radiation to interact with the radiation. The radiation impinging on the mask forms a radiation detection pattern on a radiation detector subsequent to the mask, and the pattern of the mask is designed at least partly based on a requirement of the radiation detection pattern.

In a second aspect of the invention, there is provided a method of designing a pattern of a mask for use in a wavefront sensor for a radiation, wherein the pattern of the mask is designed at least partly based on a requirement of a radiation detection pattern of the radiation, wherein the radiation detection pattern is generated on a detection plane subsequent to the mask.

In a third aspect of the invention, there is provided an assembly for a wavefront sensor comprising a detection plane e and a mask with a pattern located in path of a radiation to interact with the radiation The radiation impinging on the mask forms a radiation detection pattern on the detection plane subsequent to the mask, and the pattern of the mask is designed at least partly based on a requirement of the radiation detection pattern.

BRIEF DESCRIPTION OF THE DRAWINGS

Embodiments will now be described, by way of example only, with reference to the accompanying schematic drawings, in which.

DETAILED DESCRIPTION

In the present document, the terms "radiation" and "beam" are used to encompass all types of electromagnetic radiation and particle radiation, including ultraviolet radiation (e.g. with a wavelength of 365, 248, 193, 157 or 126 nm), EUV (extreme ultra-violet radiation, e.g. having a wavelength in the range of about 5-100 nm), X-ray radiation, electron beam radiation and other particle radiation.

The term "reticle", "mask" or "patterning device" as employed in this text may be broadly interpreted as referring to a generic patterning device that can be used to endow an incoming radiation beam with a patterned cross-section, corresponding to a pattern that is to be created in a target portion of the substrate. The term "light valve" can also be used in this context. Besides the classic mask (transmissive or reflective, binary, phase-shifting, hybrid, etc.), examples of other such patterning devices include a programmable mirror array and a programmable LCD array.

Figure 1:
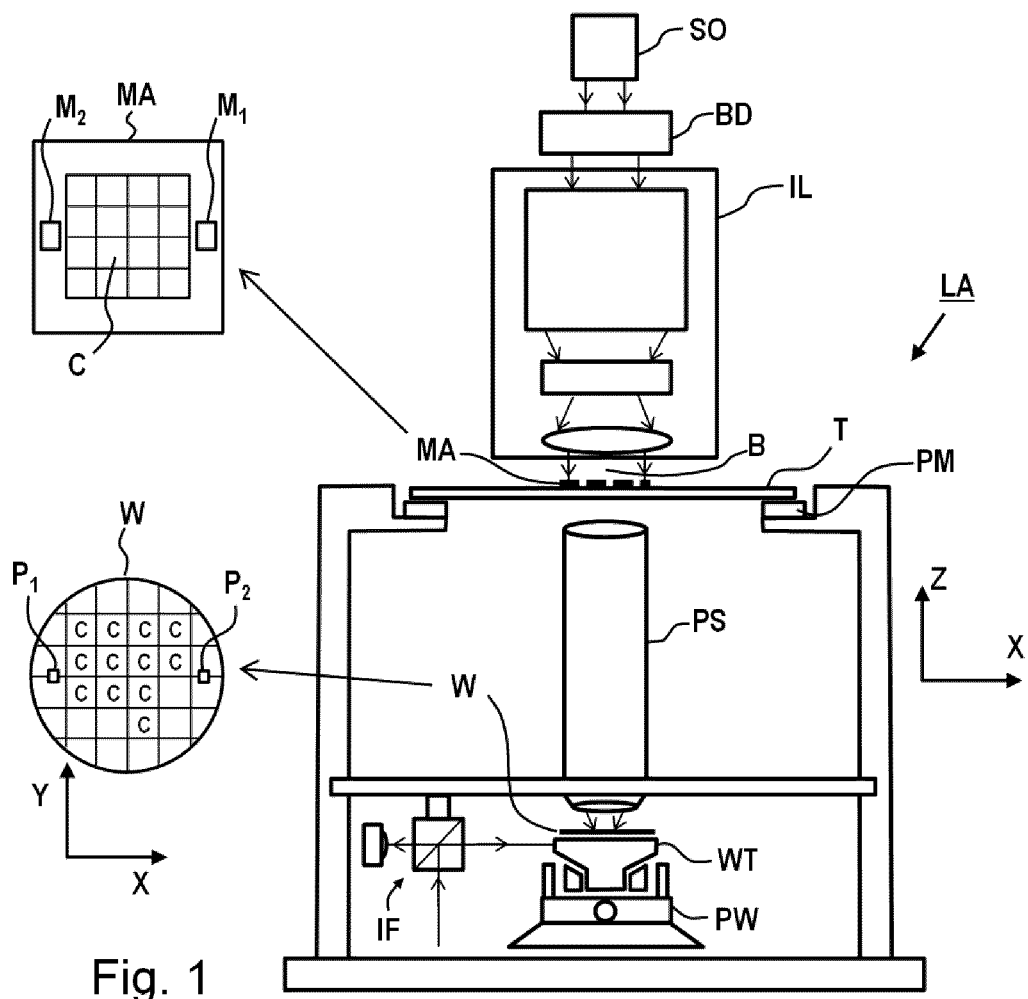
FIG. 1 depicts a schematic overview of a lithographic apparatus.

FIG. 1 schematically depicts a lithographic apparatus LA. The lithographic apparatus LA includes an illumination system(also referred to as illuminator) IL configured to condition a radiation beam B (e.g., UV radiation, DUV radiation, EUV radiation or X-ray radiation), a mask support (e.g., a mask table) T constructed to support a patterning device (e.g., a mask) MA and connected to a first positioner PM configured to accurately position the patterning device MA in accordance with certain parameters, a substrate support (e.g., a wafer table) WT constructed to hold a substrate (e.g., a resist coated wafer) W and connected to a second positioner PW configured to accurately position the substrate support in accordance with certain parameters, and a projection system(e.g., a refractive projection lens system) PS configured to project a pattern imparted to the radiation beam B by patterning device MA onto a target portion C (e.g., comprising one or more dies) of the substrate W.

In operation, the illumination system IL receives a radiation beam from a radiation source SO, e.g. via a beam delivery system BD. The illumination system IL may include various types of optical components, such as refractive, reflective, diffractive, magnetic, electromagnetic, electrostatic, and/or other types of optical components, or any combination thereof, for directing, shaping, and/or controlling radiation. The illuminator IL may be used to condition the radiation beam B to have a desired spatial and angular intensity distribution in its cross section at a plane of the patterning device MA.

The term "projection system" PS used herein should be broadly interpreted as encompassing various types of projection system, including refractive, reflective, diffractive, catadioptric, anamorphic, magnetic, electromagnetic and/or electrostatic optical systems, or any combination thereof, as appropriate for the exposure radiation being used, and/or for other factors such as the use of an immersion liquid or the use of a vacuum. Any use of the term "projection lens" herein may be considered as synonymous with the more general term "projection system" PS. 20

The lithographic apparatus LA may be of a type wherein at least a portion of the substrate may be covered by a liquid having a relatively high refractive index, e.g., water, so as to fill a space between the projection system PS and the substrate W—which is also referred to as immersion lithography. More information on immersion techniques is given in U.S. Pat. No. 6,952,253, which is incorporated herein by reference in its entirety.

The lithographic apparatus LA may also be of a type having two or more substrate supports WT (also named "dual stage"). In such "multiple stage" machine, the substrate supports WT may be used in parallel, and/or steps in preparation of a subsequent exposure of the substrate W may be carried out on the substrate W located on one of the substrate support WT while another substrate W on the other substrate support WT is being used for exposing a pattern on the other substrate W.

In addition to the substrate support WT, the lithographic apparatus LA may comprise a measurement stage. The measurement stage is arranged to hold a sensor and/or a cleaning device. The sensor may be arranged to measure a property of the projection system PS or a property of the radiation beam B. The measurement stage may hold multiple sensors. The cleaning device may be arranged to clean part of the lithographic apparatus, for example a part of the projection system PS or a part of a system that provides the immersion liquid. The measurement stage may move beneath the projection system PS when the substrate support WT is away from the projection system PS.

In operation, the radiation beam B is incident on the patterning device, e.g. mask, MA which is held on the mask support T, and is patterned by the pattern (design layout) present on patterning device MA. Having traversed the mask MA, the radiation beam B passes through the projection system PS, which focuses the beam onto a target portion C of the substrate W. With the aid of the second positioner PW and a position measurement system IF, the substrate support WT may be moved accurately, e.g., so as to position different target portions C in the path of the radiation beam B at a focused and aligned position. Similarly, the first positioner PM and possibly another position sensor (which is not explicitly depicted in FIG. 1) may be used to accurately position the patterning device MA with respect to the path of the radiation beam B. Patterning device MA and substrate W may be aligned using mask alignment marks M1. M2 and substrate alignment marks P1, P2. Although the substrate alignment marks P1, P2 as illustrated occupy dedicated target portions, they may be located in spaces between target portions. Substrate alignment marks P1, P2 are known as scribe-lane alignment marks when these are located between the target portions C.

Figure 2:
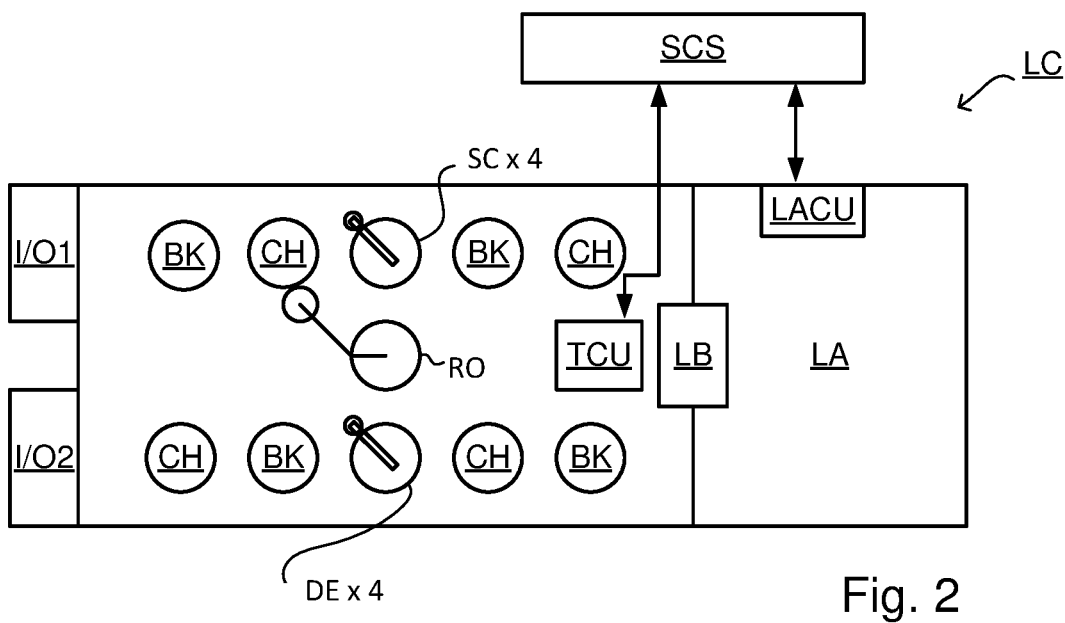
FIG. 2 depicts a schematic overview of a lithographic cell.

As shown in FIG. 2 the lithographic apparatus LA may form part of a lithographic cell LC, also sometimes referred to as a lithocell or (litho) cluster, which often also includes apparatus to perform pre-and post-exposure processes on a substrate W. Conventionally these include spin coaters SC to deposit resist layers, developers DE to develop exposed resist, chill plates CH and bake plates BK. e.g. for conditioning the temperature of substrates W e.g. for conditioning solvents in the resist layers. A substrate handler, or robot, RO picks up substrates W from input/output ports I/O1, I/O2, moves them between the different process apparatus and delivers the substrates W to the loading bay LB of the lithographic apparatus LA. The devices in the lithocell, which are often also collectively referred to as the track, may be under the control of a track control unit TCU that in itself may be controlled by a supervisory control system SCS, which may also control the lithographic apparatus LA, e.g. via lithography control unit LACU.

In lithographic processes, it is desirable to make frequently measurements of the structures created, e.g., for process control and verification. Tools to make such measurement may be called metrology tools MT. Different types of metrology tools MT for making such measurements are known, including scanning electron microscopes or various forms of scatterometer metrology tools MT. Scatterometers are versatile instruments which allow measurements of the parameters of a lithographic process by having a sensor in the pupil or a conjugate plane with the pupil of the objective of the scatterometer, measurements usually referred as pupil based measurements, or by having the sensor in an image plane or a plane conjugate with the image plane, in which case the measurements are usually referred as image or field based measurements. Such scatterometers and the associated measurement techniques are further described in patent applications US20100328655, US2011102753A1. US20120044470A, US20110249244, US20110026032 or EP1,628,164A, incorporated herein by reference in their entirety. Aforementioned scatterometers may measure gratings using light from hard X-ray, soft X-ray, extreme ultraviolet and visible to near-IR wavelength range. In case that the radiation is hard X-ray or soft X-ray, optionally with a wavelength ranging from 0.01 to 10 nm, the aforementioned scatterometers may optionally be a small-angle X-ray scattering metrology tool.

In order for the substrates W exposed by the lithographic apparatus LA to be exposed correctly and consistently, it is desirable to inspect substrates to measure properties of patterned structures, such as overlay errors between subsequent layers, line thicknesses, critical dimensions (CD), shape of structures, etc. For this purpose, inspection tools and/or metrology tools (not shown) may be included in the lithocell LC. If errors are detected, adjustments, for example, may be made to exposures of subsequent substrates or to other processing steps that are to be performed on the substrates W, especially if the inspection is done before other substrates W of the same batch or lot are still to be exposed or processed.

An inspection apparatus, which may also be referred to as a metrology apparatus, is used to determine properties of the substrates W, and in particular, how properties of different substrates W vary or how properties associated with different layers of the same substrate W vary from layer to layer. The inspection apparatus may alternatively be constructed to identify defects on the substrate W and may, for example, be part of the lithocell LC, or may be integrated into the lithographic apparatus LA, or may even be a stand-alone device. The inspection apparatus may measure the properties on a latent image (image in a resist layer after the exposure), or on a semi-latent image (image in a resist layer after a post-exposure bake step PEB), or on a developed resist image (in which the exposed or unexposed parts of the resist have been removed), or even on an etched image (after a pattern transfer step such as etching).

In a first embodiment, the scatterometer MT is an angular resolved scatterometer. In such a scatterometer reconstruction methods may be applied to the measured signal to reconstruct or calculate properties of the grating. Such reconstruction may, for example, result from simulating interaction of scattered radiation with a mathematical model of the target structure and comparing the simulation results with those of a measurement. Parameters of the mathematical model are adjusted until the simulated interaction produces a diffraction pattern similar to that observed from the real target.

In a second embodiment, the scatterometer MT is a spectroscopic scatterometer MT. In such spectroscopic scatterometer MT, the radiation emitted by a radiation source is directed onto the target and the reflected, transmitted or scattered radiation from the target is directed to a spectrometer detector, which measures a spectrum(i.e. a measurement of intensity as a function of wavelength) of the specular reflected radiation. From this data, the structure or profile of the target giving rise to the detected spectrum may be reconstructed, e.g. by Rigorous Coupled Wave Analysis and non-linear regression or by comparison with a library of simulated spectra.

In a third embodiment, the scatterometer MT is an ellipsometric scatterometer. The ellipsometric scatterometer allows for determining parameters of a lithographic process by measuring scattered or transmitted radiation for each polarization states. Such metrology apparatus emits polarized light (such as linear, circular, or elliptic) by using, for example, appropriate polarization filters in the illumination section of the metrology apparatus. A source suitable for the metrology apparatus may provide polarized radiation as well. Various embodiments of existing ellipsometric scatterometers are described in U.S. patent application Ser. Nos. 11/451,599, 11/708,678, 12/256,780, 12/486,449, 12/920, 968, 12/922,587, 13/000,229, 13/033.135, 13/533,110 and 13/891,410 incorporated herein by reference in their entirety.

In one embodiment of the scatterometer MT, the scatterometer MT is adapted to measure the overlay of two misaligned gratings or periodic structures by measuring asymmetry in the reflected spectrum and/or the detection configuration, the asymmetry being related to the extent of the overlay. The two (maybe overlapping) grating structures may be applied in two different layers (not necessarily consecutive layers), and may be formed substantially at the same position on the wafer. The scatterometer may have a symmetrical detection configuration as described e.g. in co-owned patent application EP1,628,164A, such that any asymmetry is clearly distinguishable. This provides a straightforward way to measure misalignment in gratings. Further examples for measuring overlay error between the two layers containing periodic structures as target is measured through asymmetry of the periodic structures may be found in PCT patent application publication no. WO 2011/012624 or US patent application US20160161863, incorporated herein by reference in its entirety.

Other parameters of interest may be focus and dose. Focus and dose may be determined simultaneously by scatterometry (or alternatively by scanning electron microscopy) as described in US patent application US2011-0249244, incorporated herein by reference in its entirety. A single structure may be used which has a unique combination of critical dimension and sidewall angle measurements for each point in a focus energy matrix (FEM—also referred to as Focus Exposure Matrix). If these unique combinations of critical dimension and sidewall angle are available, the focus and dose values may be uniquely determined from these measurements.

A metrology target may be an ensemble of composite gratings, formed by a lithographic process, mostly in resist, but also after etch process for example. The pitch and line-width of the structures in the gratings may strongly depend on the measurement optics (in particular the NA of the optics) to be able to capture diffraction orders coming from the metrology targets. As indicated earlier, the diffracted signal may be used to determine shifts between two layers (also referred to 'overlay') or may be used to reconstruct at least part of the original grating as produced by the lithographic process. This reconstruction may be used to provide guidance of the quality of the lithographic process and may be used to control at least part of the lithographic process. Targets may have smaller sub-segmentation which are configured to mimic dimensions of the functional part of the design layout in a target. Due to this sub-segmentation, the targets will behave more similar to the functional part of the design layout such that the overall process parameter measurements resemble the functional part of the design layout better. The targets may be measured in an underfilled mode or in an overfilled mode. In the underfilled mode, the measurement beam generates a spot that is smaller than the overall target. In the overfilled mode, the measurement beam generates a spot that is larger than the overall target. In such overfilled mode, it may also be possible to measure different targets simultaneously, thus determining different processing parameters at the same time.

Overall measurement quality of a lithographic parameter using a specific target is at least partially determined by the measurement recipe used to measure this lithographic parameter. The term "substrate measurement recipe" may include one or more parameters of the measurement itself, one or more parameters of the one or more patterns measured, or both. For example, if the measurement used in a substrate measurement recipe is a diffraction-based optical measurement, one or more of the parameters of the measurement may include the wavelength of the radiation, the polarization of the radiation, the incident angle of radiation relative to the substrate, the orientation of radiation relative to a pattern on the substrate, etc. One of the criteria to select a measurement recipe may, for example, be a sensitivity of one of the measurement parameters to processing variations. More examples are described in US patent application US2016-0161863 and published US patent application US 2016/0370717A1 incorporated herein by reference in its entirety.

Figure 3:
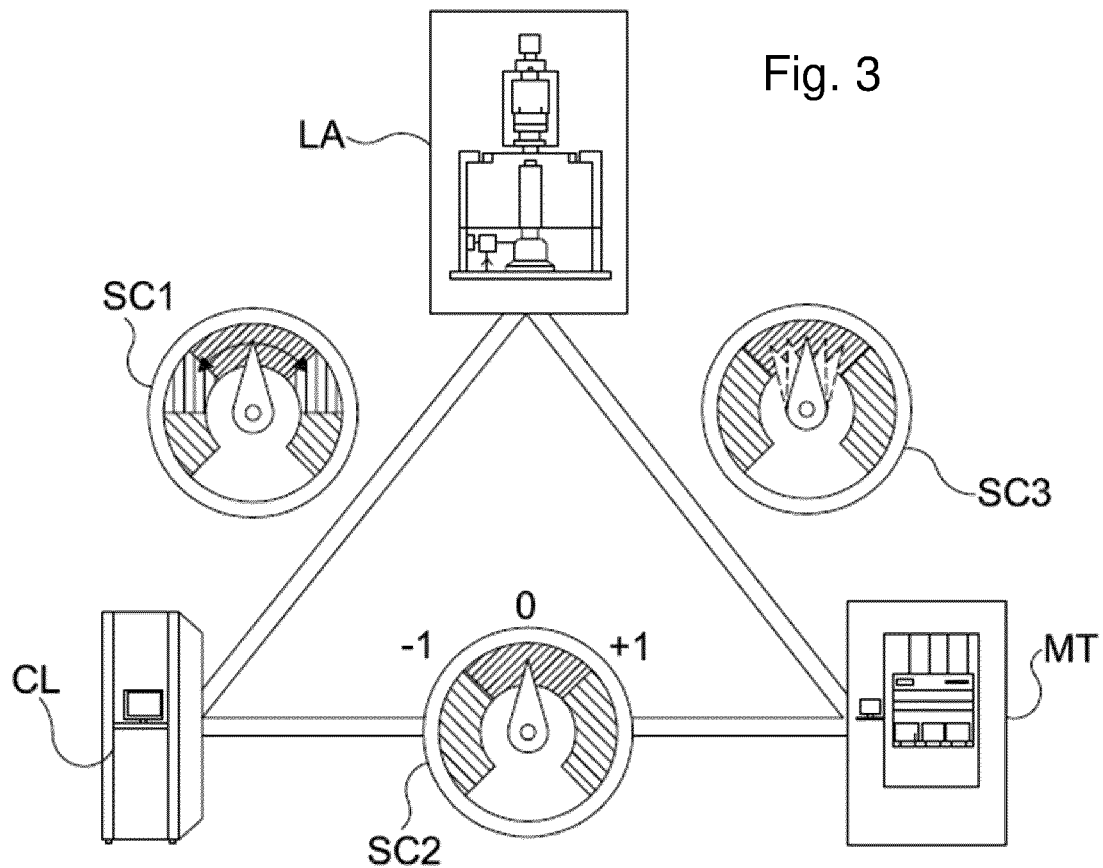
FIG. 3 depicts a schematic representation of holistic lithography, representing a cooperation between three key technologies to optimize semiconductor manufacturing.

The patterning process in a lithographic apparatus LA may be one of the most critical steps in the processing which requires high accuracy of dimensioning and placement of structures on the substrate W. To ensure this high accuracy, three systems may be combined in a so called "holistic" control environment as schematically depicted in FIG. 3. One of these systems is the lithographic apparatus LA which is (virtually) connected to a metrology tool MT (a second system) and to a computer system CL (a third system). The key of such "holistic" environment is to optimize the cooperation between these three systems to enhance the overall process window and provide tight control loops to ensure that the patterning performed by the lithographic apparatus LA stays within a process window. The process window defines a range of process parameters (e.g. dose, focus, overlay) within which a specific manufacturing process yields a defined result (e.g. a functional semiconductor device)—maybe within which the process parameters in the lithographic process or patterning process are allowed to vary.

The computer system CL may use (part of) the design layout to be patterned to predict which resolution enhancement techniques to use and to perform computational lithography simulations and calculations to determine which mask layout and lithographic apparatus settings achieve the largest overall process window of the patterning process (depicted in FIG. 3 by the double arrow in the first scale SC1). The resolution enhancement techniques may be arranged to match the patterning possibilities of the lithographic apparatus LA. The computer system CL may also be used to detect where within the process window the lithographic apparatus LA is currently operating (e.g. using input from the metrology tool MET) to predict whether defects may be present due to e.g. sub-optimal processing (depicted in FIG. 3 by the arrow pointing "0" in the second scale SC2).

The metrology tool MT may provide input to the computer system CL to enable accurate simulations and predictions, and may provide feedback to the lithographic apparatus LA to identify possible drifts, e.g. in a calibration status of the lithographic apparatus LA (depicted in FIG. 3 by the multiple arrows in the third scale SC3).

In lithographic processes, it is desirable to make frequently measurements of the structures created, e.g., for process control and verification. Various tools for making such measurements are known, including scanning electron microscopes or various forms of metrology apparatuses, such as scatterometers. Examples of known scatterometers often rely on provision of dedicated metrology targets, such as underfilled targets (a target, in the form of a simple grating or overlapping gratings in different layers, that is large enough that a measurement beam generates a spot that is smaller than the grating) or overfilled targets (whereby the illumination spot partially or completely contains the target). Further, the use of metrology tools, for example an angular resolved scatterometer illuminating an underfilled target, such as a grating, allows the use of so-called reconstruction methods where the properties of the grating may be calculated by simulating interaction of scattered radiation with a mathematical model of the target structure and comparing the simulation results with those of a measurement. Parameters of the model are adjusted until the simulated interaction produces a diffraction pattern similar to that observed from the real target.

Scatterometers are versatile instruments which allow measurements of the parameters of a lithographic process by having a sensor in or close to the pupil plane or a conjugate plane with the pupil of the objective of the scatterometer, measurements usually referred as pupil based measurements, or by having the sensor in or close to the image plane or a plane conjugate with the image plane, in which case the measurements are usually referred as image or field based measurements. Such scatterometers and the associated measurement techniques are further described in patent applications US20100328655, US2011102753A1, US20120044470A, US20110249244, US20110026032 or EP1,628,164A, incorporated herein by reference in their entirety. Aforementioned scatterometers may measure in one image multiple targets from multiple gratings using light from hard X-ray, soft X-ray, extreme ultraviolet, visible to near-IR and IR wave range.

Figure 4:
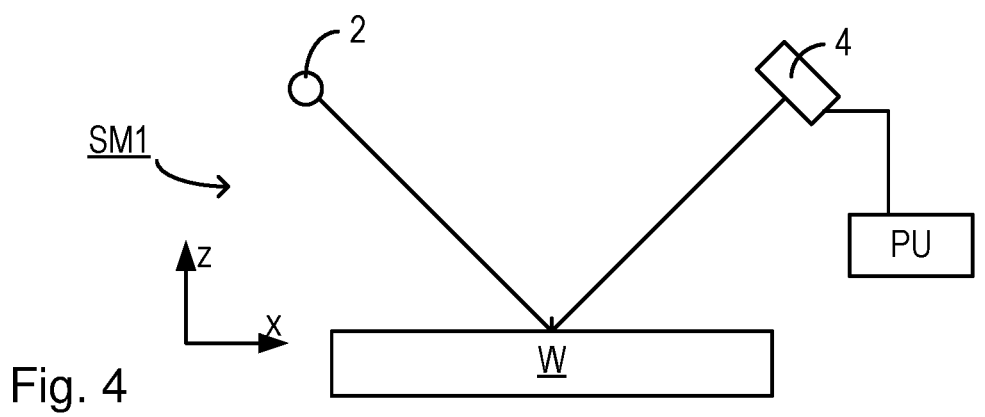
FIG. 4 schematically illustrates a scatterometry apparatus.
Figure 4:
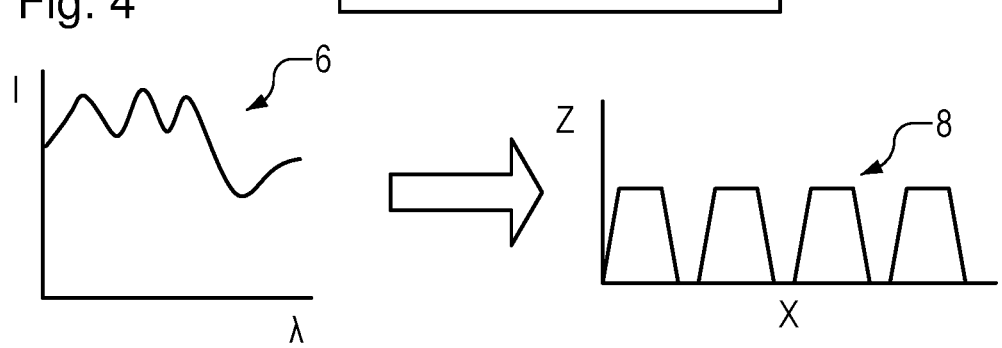

One example of a metrology apparatus, such as a scatterometer, is depicted in FIG. 4. It may comprise a broadband (e.g. white light) radiation or narrowband radiation projector 2 which projects radiation 5 onto a substrate W. The reflected or scattered radiation 10 is passed to a spectrometer detector 4, which measures a spectrum 6 (i.e. a measurement of intensity I as a function of wavelength 2) of the specular reflected radiation. From this data, the structure or profile 8 giving rise to the detected spectrum may be reconstructed by processing unit PU, e.g. by Rigorous Coupled Wave Analysis and non-linear regression or by comparison with a library of simulated spectra as shown at the bottom of FIG. 4. In general, for the reconstruction, the general form of the structure is known and some parameters are assumed from knowledge of the process by which the structure was made, leaving only a few parameters of the structure to be determined from the scatterometry data. Such a scatterometer may be configured as a normal-incidence scatterometer or an oblique-incidence scatterometer.

As an alternative to optical metrology methods, it has also been considered to use hard X-ray, soft X-rays or EUV radiation, for example radiation in a wavelength range between 0.01 nm and 100 nm, or optionally between 1 nm and 50 nm or optionally between 8 nm and 20 nm or between 10 nm and 20 nm. Reflectometry techniques using X-rays (GI-XRS) and extreme ultraviolet (EUV) radiation at grazing incidence may be used for measuring properties of films and stacks of layers on a substrate. Within the general field of reflectometry, goniometric and/or spectroscopic techniques may be applied. In goniometry, the variation of a reflected beam with different incidence angles may be measured. Spectroscopic reflectometry, on the other hand, measures the spectrum of wavelengths reflected at a given angle (using broadband radiation or narrowband radiation). For example, EUV reflectometry has been used for inspection of mask blanks, prior to manufacture of reticles (patterning devices) for use in EUV lithography.

Figure 5:
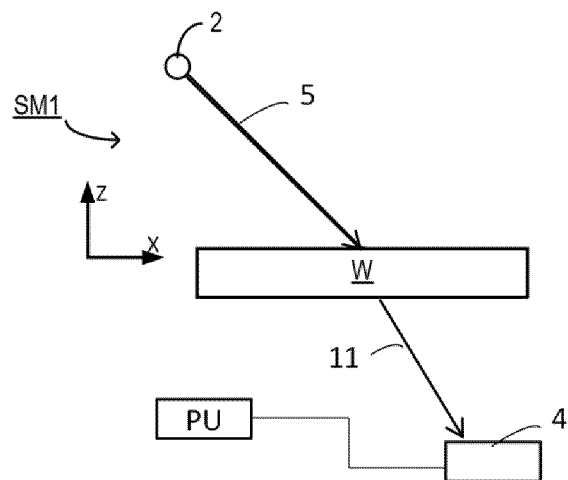
FIG. 5 schematically illustrates a transmissive scatterometry apparatus.

A transmissive version of the example of a metrology apparatus, such as a scatterometer shown in FIG. 4, is depicted in FIG. 5. The transmitted radiation 11 is passed to a spectrometer detector 4, which measures a spectrum 6 as discussed for FIG. 4. Such a scatterometer may be configured as a normal-incidence scatterometer or an oblique-incidence scatterometer.

It is possible that the range of application makes the use of wavelengths in e.g. the soft X-rays or EUV domain not sufficient. One example of metrology tool functioning in one of the above presented wavelength ranges is transmissive small angle X-ray scattering (T-SAXS as in US2007224518A which content is incorporated herein by reference in its entirety). Profile (CD) measurements using T-SAXS are discussed by Lemaillet et al in "Intercomparison between optical and X-ray scatterometry measurements of FinFET structures", Proc. of SPIE, 2013, 8681. Published patent applications US20130304424A1 and US2014019097A1 (Bakeman et al/KLA) describe hybrid metrology techniques in which measurements made using x-rays and optical measurements with wavelengths in the range 120 nm and 2000 nm are combined together to obtain a measurement of a parameter such as CD. A CD measurement is obtained by coupling and x-ray mathematical model and an optical mathematical model through one or more common. The contents of the cited US patent applications are incorporated herein by reference in their entirety.

Figure 6:
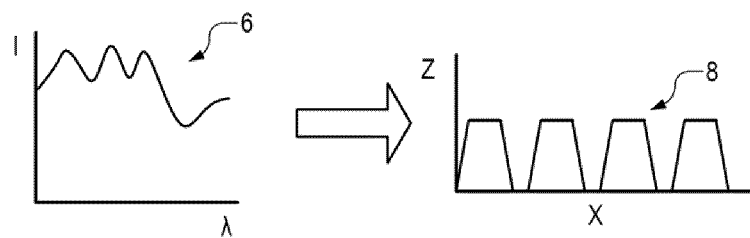
FIG. 6 depicts a schematic representation of a metrology apparatus in which EUV and/or SXR radiation is used.
Figure 6:
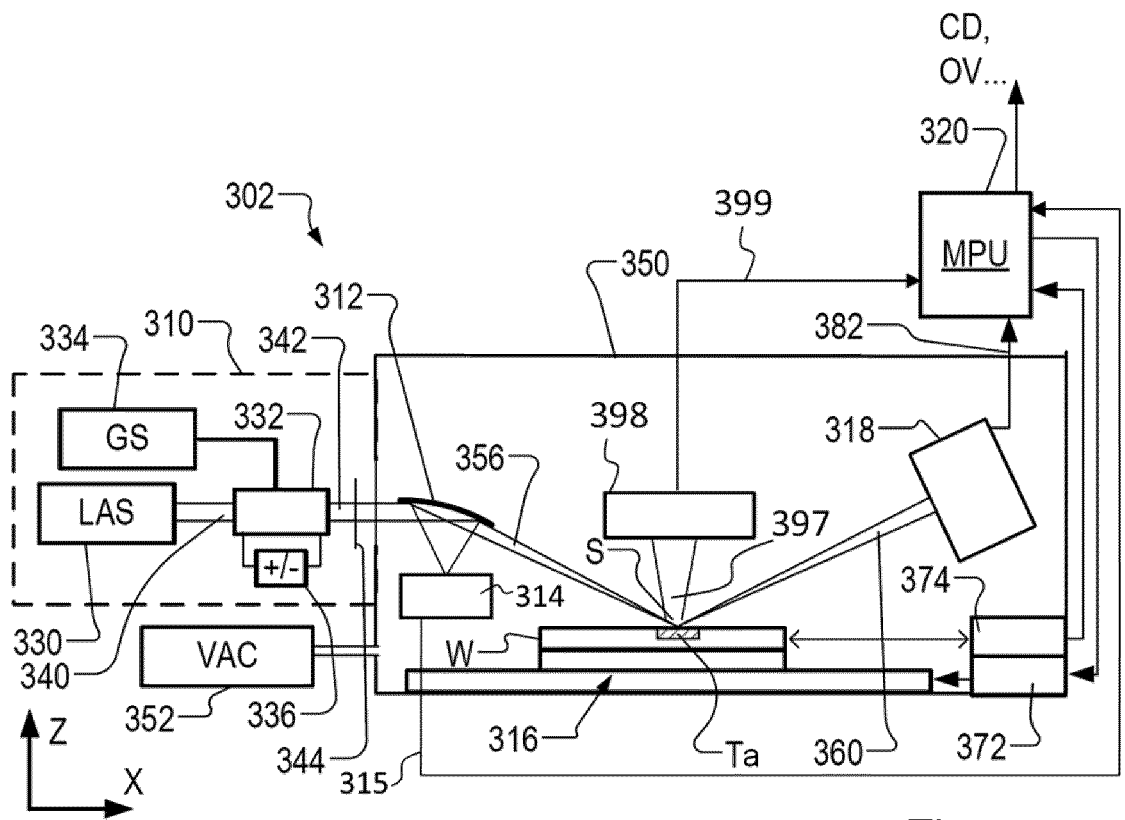

FIG. 6 depicts a schematic representation of a metrology apparatus 302 in which radiation in the wavelength range from 0.01 nm to 100 nm may be used to measure parameters of structures on a substrate. The metrology apparatus 302 presented in FIG. 6 may be suitable for the hard X-ray, soft X-rays or EUV domain.

FIG. 6 illustrates a schematic physical arrangement of a metrology apparatus 302 comprising a spectroscopic scatterometer using hard X-ray (HXR) and/or Soft X-Ray (SXR) and/or EUV radiation optionally in grazing incidence, purely by way of example. An alternative form of inspection apparatus might be provided in the form of an angle-resolved scatterometer, which may use radiation in normal or near-normal incidence similar to the conventional scatterometers operating at longer wavelengths. An alternative form of inspection apparatus might be provided in the form of a transmissive scatterometer, to which the configuration in FIG. 5 applies.

Inspection apparatus 302 comprises a radiation source or called illumination source 310, illumination system 312, substrate support 316, detection systems 318, 398 and metrology processing unit (MPU) 320.

An illumination source 310 in this example is for a generation of EUV, hard X-ray or soft X-ray radiation. The illumination source 310 may be based on high harmonic generation (HHG) techniques as shown in FIG. 6, and it may also be other types of illumination sources, e.g. liquid metal jet source, inverse Compton scattering (ICS) source, plasma channel source, magnetic undulator source or free electron laser (FEL) source.

For the example of HHG source, as shown in FIG. 6, main components of the radiation source are a pump radiation source 330 operable to emit the pump radiation and a gas delivery system 332. Optionally the pump radiation source 330 is a laser, optionally the pump radiation source 330 is a pulsed high-power infrared or optical laser. The pump radiation source 330 may be, for example, a fiber-based laser with an optical amplifier, producing pulses of infrared radiation that may last for example less than 1 ns (1 nanosecond) per pulse, with a pulse repetition rate up to several megahertz, as required. The wavelength of the infrared radiation may be for example in the region of 1 µm(1 micron). Optionally, the laser pulses are delivered as a first pump radiation 340 to the gas delivery system 332, where in the gas a portion of the radiation is converted to higher frequencies than the first radiation into an emitted radiation 342. A gas supply 334 supplies a suitable gas to the gas delivery system 332, where it is optionally ionized by an electric source 336. The gas delivery system 332 may be a cut tube. A gas provided by the gas delivery system 332 defines a gas target, which may be a gas flow or a static volume. The gas may be for example a noble gas such as Neon (Ne), Helium(He) or Argon (Ar). Nitrogen ($N_2$), oxygen ($O_2$), Argon (Ar), Krypton (Kr), Xenon (Xe) gases may all be considered. These may be selectable options within the same apparatus.

The emitted radiation may contain multiple wavelengths. If the emitted radiation were monochromatic, then measurement calculations (for example reconstruction) may be simplified, but it is easier to produce radiation with several wavelengths. An emission divergence angle of the emitted radiation may be wavelength dependent. Different wavelengths will, for example, provide different levels of contrast when imaging structure of different materials. For inspection of metal structures or silicon structures, for example, different wavelengths may be selected to those used for imaging features of (carbon-based) resist, or for detecting contamination of such different materials. One or more filtering devices 344 may be provided. For example a filter such as a thin membrane of Aluminum(Al) or Zirconium(Zr) may serve to cut the fundamental IR radiation from passing further into the inspection apparatus. A grating (not shown) may be provided to select one or more specific wavelengths from among those generated. Optionally some or all of beam path of the emitted radiation may be contained within a vacuum environment, bearing in mind that SXR and/or EUV radiation is absorbed when traveling in air. The various components of radiation source 310 and illumination optics 312 may be adjustable to implement different metrology 'recipes' within the same apparatus. For example different wavelengths and/or polarization may be made selectable.

Depending on the materials of the structure under inspection, different wavelengths may offer a desired level of penetration into lower layers. For resolving the smallest device features and defects among the smallest device features, then a short wavelength is likely to be preferred. For example, one or more wavelengths in the range 0.01-20 nm or optionally in the range 1-10 nm or optionally in the range 10-20 nm may be chosen. Wavelengths shorter than 5 nm may suffer from very low critical angle when reflecting off materials of interest in semiconductor manufacture. Therefore to choose a wavelength greater than 5 nm may provide stronger signals at higher angles of incidence. On the other hand, if the inspection task is for detecting the presence of a certain material, for example to detect contamination, then wavelengths up to 50 nm could be useful.

From the radiation source 310, the filtered beam 342 enters an inspection chamber 350 where the substrate W including a structure of interest is held for inspection at a measurement position by substrate support 316. The structure of interest is labeled T. Optionally the atmosphere within inspection chamber 350 maybe maintained near vacuum by vacuum pump 352, so that SXR and/or EUV radiation may pass with-out undue attenuation through the atmosphere. The Illumination system 312 has the function of focusing the radiation into a focused beam 356, and may comprise for example a two-dimensionally curved mirror, or a series of one-dimensionally curved mirrors, as described in published US patent application US2017/0184981A1 (which content is incorporated herein by reference in its entirety), mentioned above. The focusing is performed to achieve a round or elliptical spot S under 10 µm in diameter, when projected onto the structure of interest. Substrate support 316 comprises for example an X-Y translation stage and a rotation stage, by which any part of the substrate W may be brought to the focal point of beam to in a desired orientation. Thus the radiation spot S is formed on the structure of interest. Alternatively, or additionally, substrate support 316 comprises for example a tilting stage that may tilt the substrate W at a certain angle to control the angle of incidence of the focused beam on the structure of interest T.

Optionally, the illumination system 312 provides a reference beam of radiation to a reference detector 314 which may be configured to measure a spectrum and/or intensities of different wavelengths in the filtered beam 342. The reference detector 314 may be configured to generate a signal 315 that is provided to processor 310 and the filter may comprise information about the spectrum of the filtered beam 342 and/or the intensities of the different wavelengths in the filtered beam.

Reflected radiation 360 is captured by detector 318 and a spectrum is provided to processor 320 for use in calculating a property of the target structure T. The illumination system 312 and detection system 318 thus form an inspection apparatus. This inspection apparatus may comprise a hard X-ray, soft X-ray and/or EUV spectroscopic reflectometer of the kind described in US2016282282A1 which content is incorporated herein by reference in its entirety.

If the target Ta has a certain periodicity, the radiation of the focused beam 356 may be partially diffracted as well. The diffracted radiation 397 follows another path at well-defined angles with respect to the angle of incidence then the reflected radiation 360. In FIG. 6, the drawn diffracted radiation 397 is drawn in a schematic manner and diffracted radiation 397 may follow many other paths than the drawn paths. The inspection apparatus 302 may also comprise further detection systems 398 that detect and/or image at least a portion of the diffracted radiation 397. In FIG. 6 a single further detection system 398 is drawn, but embodiments of the inspection apparatus 302 may also comprise more than one further detection system 398 that are arranged at different position to detect and/or image diffracted radiation 397 at a plurality of diffraction directions. In other words, the (higher) diffraction orders of the focused radiation beam that impinges on the target Ta are detected and/or imaged by one or more further detection systems 398. The one or more detection systems 398 generates a signal 399 that is provided to the metrology processor 320. The signal 399 may include information of the diffracted light 397 and/or may include images obtained from the diffracted light 397.

To aid the alignment and focusing of the spot S with desired product structures, inspection apparatus 302 may also provide auxiliary optics using auxiliary radiation under control of metrology processor 320. Metrology processor 320 may also communicate with a position controller 372 which operates the translation stage, rotation and/or tilting stages. Processor 320 receives highly accurate feedback on the position and orientation of the substrate, via sensors. Sensors 374 may include interferometers, for example, which may give accuracy in the region of picometers. In the operation of the inspection apparatus 302, spectrum data 382 captured by detection system 318 is delivered to metrology processing unit 320.

As mentioned an alternative form of inspection apparatus uses hard X-ray, soft X-ray and/or EUV radiation optionally at normal incidence or near-normal incidence, for example to perform diffraction-based measurements of asymmetry. Both types of inspection apparatus could be provided in a hybrid metrology system. Performance parameters to be measured may include overlay (OVL), critical dimension (CD), focus of the lithography apparatus while the lithography apparatus printed the target structure, coherent diffraction imaging (CDI) and at-resolution overlay (ARO) metrology. The hard X-ray, soft X-ray and/or EUV radiation may for example have wavelengths less than 100 nm, for example using radiation in the range 5-30 nm, of optionally in the range from 10 nm to 20 nm. The radiation may be narrowband or broadband in character. The radiation may have discrete peaks in a specific wavelength band or may have a more continuous character.

Like the optical scatterometer used in today's production facilities, the inspection apparatus 302 may be used to measure structures within the resist material treated within the litho cell (After Develop Inspection or ADI), and/or to measure structures after they have been formed in harder material (After Etch Inspection or AEI). For example, substrates may be inspected using the inspection apparatus 302 after they have been processed by a developing apparatus, etching apparatus, annealing apparatus and/or other apparatus.

A topography measurement system, level sensor or height sensor, and which may be integrated in the lithographic apparatus, is arranged to measure a topography of a top surface of a substrate (or wafer). A map of the topography of the substrate, also referred to as height map, may be generated from these measurements indicating a height of the substrate as a function of the position on the substrate. This height map may subsequently be used to correct the position of the substrate during transfer of the pattern on the substrate, in order to provide an aerial image of the patterning device in a properly focus position on the substrate. It will be understood that "height" in this context refers to a dimension broadly out of the plane to the substrate (also referred to as Z-axis). Typically, the level or height sensor performs measurements at a fixed location (relative to its own optical system) and a relative movement between the substrate and the optical system of the level or height sensor results in height measurements at locations across the substrate.

Figure 8:
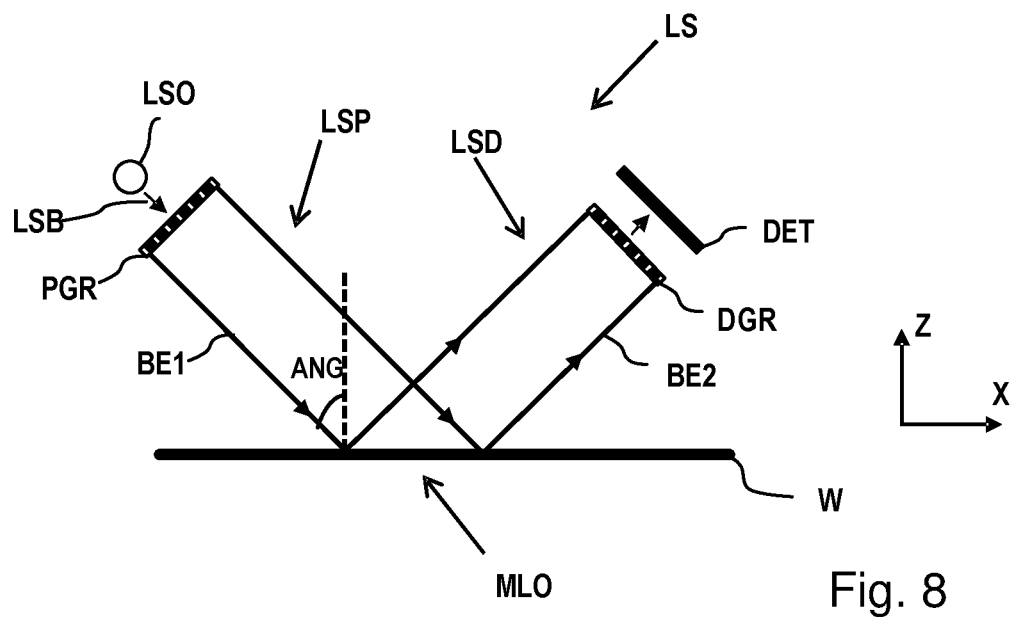
FIG. 8 depicts a schematic block diagram of a level sensor.

An example of a level or height sensor LS as known in the art is schematically shown in FIG. 8, which illustrates only the principles of operation. In this example, the level sensor comprises an optical system, which includes a projection unit LSP and a detection unit LSD. The projection unit LSP comprises a radiation source LSO providing a beam of radiation LSB which is imparted by a projection grating PGR of the projection unit LSP. The radiation source LSO may be, for example, a narrowband or broadband radiation source, such as a supercontinuum light source, polarized or non-polarized, pulsed or continuous, such as a polarized or non-polarized laser beam. The radiation source LSO may include a plurality of radiation sources having different colors, or wavelength ranges, such as a plurality of LEDs. The radiation source LSO of the level sensor LS is not restricted to visible radiation, but may additionally or alternatively encompass UV and/or IR radiation and any range of wavelengths suitable to reflect from a surface of a substrate.

The projection grating PGR is a periodic grating comprising a periodic structure resulting in a beam of radiation BE1 having a periodically varying intensity. The beam of radiation BE1 with the periodically varying intensity is directed towards a measurement location MLO on a substrate W having an angle of incidence ANG with respect to an axis perpendicular (Z-axis) to the incident substrate surface between 0 degrees and 90 degrees, typically between 70 degrees and 80 degrees. At the measurement location MLO, the patterned beam of radiation BE1 is reflected by the substrate W (indicated by arrows BE2) and directed towards the detection unit LSD.

In order to determine the height level at the measurement location MLO, the level sensor further comprises a detection system comprising a detection grating DGR, a detector DET and a processing unit (not shown) for processing an output signal of the detector DET. The detection grating DGR may be identical to the projection grating PGR. The detector DET produces a detector output signal indicative of the light received, for example indicative of the intensity of the light received, such as a photodetector, or representative of a spatial distribution of the intensity received, such as a camera. The detector DET may comprise any combination of one or more detector types.

By means of triangulation techniques, the height level at the measurement location MLO can be determined. The detected height level is typically related to the signal strength as measured by the detector DET, the signal strength having a periodicity that depends, amongst others, on the design of the projection grating PGR and the (oblique) angle of incidence ANG.

The projection unit LSP and/or the detection unit LSD may include further optical elements, such as lenses and/or mirrors, along the path of the patterned beam of radiation between the projection grating PGR and the detection grating DGR (not shown).

In an embodiment, the detection grating DGR may be omitted, and the detector DET may be placed at the position where the detection grating DGR is located. Such a configuration provides a more direct detection of the image of the projection grating PGR.

In order to cover the surface of the substrate W effectively, a level sensor LS may be configured to project an array of measurement beams BE1 onto the surface of the substrate W, thereby generating an array of measurement areas MLO or spots covering a larger measurement range.

Various height sensors of a general type are disclosed for example in U.S. Pat. Nos. 7,265,364 and 7,646,471, both incorporated by reference. A height sensor using UV radiation instead of visible or infrared radiation is disclosed in US2010233600A1, incorporated by reference. In WO2016102127A1, incorporated by reference, a compact height sensor is described which uses a multi-element detector to detect and recognize the position of a grating image, without needing a detection grating.

In the manufacture of complex devices, typically many lithographic patterning steps are performed, thereby forming functional features in successive layers on the substrate. A critical aspect of performance of the lithographic apparatus is therefore the ability to place the applied pattern correctly and accurately in relation to features laid down in previous layers (by the same apparatus or a different lithographic apparatus). For this purpose, the substrate is provided with one or more sets of marks. Each mark is a structure whose position can be measured at a later time using a position sensor, typically an optical position sensor. The position sensor may be referred to as "alignment sensor" and marks may be referred to as "alignment marks".

A lithographic apparatus may include one or more (e.g. a plurality of) alignment sensors by which positions of alignment marks provided on a substrate can be measured accurately. Alignment (or position) sensors may use optical phenomena such as diffraction and interference to obtain position information from alignment marks formed on the substrate. An example of an alignment sensor used in current lithographic apparatus is based on a self-referencing interferometer as described in U.S. Pat. No. 6,961,116. Various enhancements and modifications of the position sensor have been developed, for example as disclosed in US2015261097A1. The contents of all of these publications are incorporated herein by reference.

Figure 7:
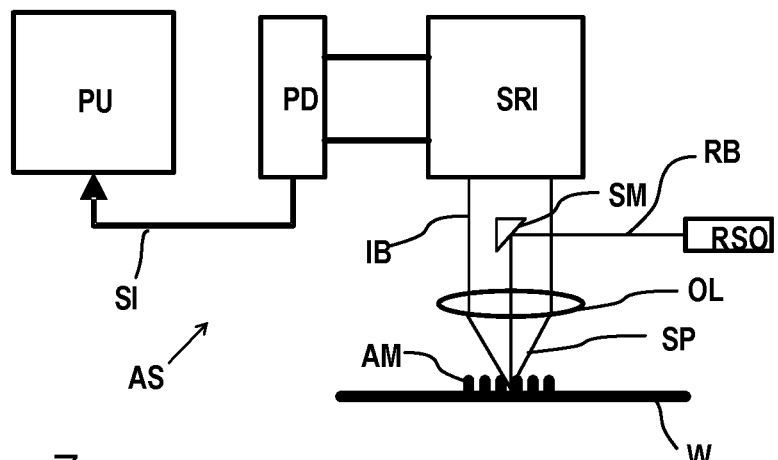
FIG. 7 depicts a schematic block diagram of an alignment sensor.

FIG. 7 is a schematic block diagram of an embodiment of a known alignment sensor AS, such as is described, for example, in U.S. Pat. No. 6,961,116, and which is incorporated by reference. Radiation source RSO provides a beam RB of radiation of one or more wavelengths, which is diverted by diverting optics onto a mark, such as mark AM located on substrate W, as an illumination spot SP. In this example the diverting optics comprises a spot mirror SM and an objective lens OL. The illumination spot SP, by which the mark AM is illuminated, may be slightly smaller in diameter than the width of the mark itself.

Radiation diffracted by the mark AM is collimated (in this example via the objective lens OL) into an information-carrying beam IB. The term "diffracted" is intended to include zero-order diffraction from the mark (which may be referred to as reflection). A self-referencing interferometer SRI, e.g. of the type disclosed in U.S. Pat. No. 6,961,116 mentioned above, interferes the beam IB with itself after which the beam is received by a photodetector PD. Additional optics (not shown) may be included to provide separate beams in case more than one wavelength is created by the radiation source RSO. The photodetector may be a single element, or it may comprise a number of pixels, if desired. The photodetector may comprise a sensor array.

The diverting optics, which in this example comprises the spot mirror SM, may also serve to block zero order radiation reflected from the mark, so that the information-carrying beam IB comprises only higher order diffracted radiation from the mark AM (this is not essential to the measurement, but improves signal to noise ratios). Intensity signals SI are supplied to a processing unit PU. By a combination of optical processing in the block SRI and computational processing in the unit PU, values for X- and Y-position on the substrate relative to a reference frame are output.

A single measurement of the type illustrated only fixes the position of the mark within a certain range corresponding to one pitch of the mark. Coarser measurement techniques are used in conjunction with this to identify which period of a sine wave is the one containing the marked position. The same process at coarser and/or finer levels may be repeated at different wavelengths for increased accuracy and/or for robust detection of the mark irrespective of the materials from which the mark is made, and materials on and/or below which the mark is provided. The wavelengths may be multiplexed and de-multiplexed optically so as to be processed simultaneously, and/or they may be multiplexed by time division or frequency division.

In this example, the alignment sensor and spot SP remain stationary, while it is the substrate W that moves. The alignment sensor can thus be mounted rigidly and accurately to a reference frame, while effectively scanning the mark AM in a direction opposite to the direction of movement of substrate W. The substrate W is controlled in this movement by its mounting on a substrate support and a substrate positioning system controlling the movement of the substrate support. A substrate support position sensor (e.g. an interferometer) measures the position of the substrate support (not shown). In an embodiment, one or more (alignment) marks are provided on the substrate support. A measurement of the position of the marks provided on the substrate support allows the position of the substrate support as determined by the position sensor to be calibrated (e.g. relative to a frame to which the alignment system is connected). A measurement of the position of the alignment marks provided on the substrate allows the position of the substrate relative to the substrate support to be determined.

Metrology tools MT, including but not limited to the scatterometers mentioned above, may use radiation from a radiation source to perform a measurement. The radiation used by a metrology tool MT may be electromagnetic radiation. The radiation may be optical radiation, for example radiation in the infrared, visible, and/or ultraviolet parts of the electromagnetic spectrum. Metrology tools MT may use radiation to measure or inspect properties and aspects of a substrate, for example a lithographically exposed pattern on a semiconductor substrate. The type and quality of the measurement may depend on several properties of the radiation used by the metrology tool MT. For example, the resolution of an electromagnetic measurement may depend on the wavelength of the radiation, with smaller wavelengths able to measure smaller features, e.g. due to the diffraction limit. In order to measure features with small dimensions, it may be preferable to use radiation with a short wavelength, for example EUV, hard X-ray (HXR) and/or Soft X-Ray (SXR) radiation, to perform measurements. In order to perform metrology at a particular wavelength or wavelength range, the metrology tool MT requires access to a source providing radiation at that/those wavelength(s). Different types of sources exist for providing different wavelengths of radiation. Depending on the wavelength(s) provided by a source, different types of radiation generation methods may be used. For extreme ultraviolet (EUV) radiation (e.g. 1 nm to 100 nm), and/or soft X-ray (SXR) radiation (e.g. 0.1 nm to 10 nm), a source may use High Harmonic Generation (HHG) or inverse Compton scattering (ICS) to obtain radiation at the desired wavelength(s).

Figure 9:
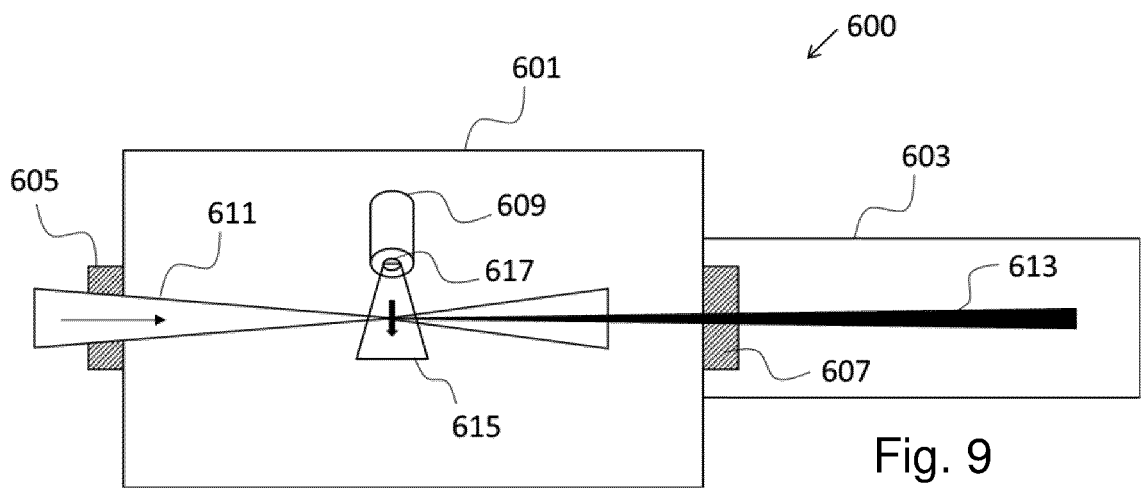
FIG. 9 depicts a schematic representation of an illumination source for high harmonic generation.

FIG. 9 shows a simplified schematic drawing of an embodiment 600 of an illumination source 310, which may be the illumination source for high harmonic generation (HHG). One or more of the features of the illumination source in the metrology tool described with respect to FIG. 6 may also be present in the illumination source 600 as appropriate. However such an illumination source may be used to provide measurement illumination in any of the metrology devices of FIGS. 4 to 8.

The illumination source 600 comprises a chamber 601 and is configured to receive a pump radiation 611 with a propagation direction which is indicated by an arrow. The pump radiation 611 shown here is an example of the pump radiation 340 from the pump radiation source 330, as shown in FIG. 6. The pump radiation 611 may be directed into the chamber 601 through the radiation input 605, which maybe a viewport, optionally made of fused silica or a comparable material. The pump radiation 611 may have a Gaussian or hollow, for example annular, transversal cross-sectional profile and may be incident, optionally focused, on a gas flow 615, which has a flow direction indicated by a second arrow, within the chamber 601. The gas flow 615 comprises a small volume (for example several cubic mm) of a particular gas (e.g., a noble gas, optionally Helium, Argon, Xenon or Neon, nitrogen, oxygen or carbon dioxide) in which the gas pressure is above a certain value. The gas flow 615 may be a steady flow. Other media, such as metallic plasmas (e.g. Aluminum plasma) may also be used.

The gas delivery system of the illumination source 600 is configured to provide the gas flow 615. The illumination source 600 is configured to provide the pump radiation 611 in the gas flow 615 to drive the generation of emitted radiation 613. The region where at least a majority of the emitted radiation 613 is generated is called an interaction region. The interaction region may vary from several tens of micrometers (for tightly focused pump radiation) to several mm or cm(for moderately focused pump radiation) or even up to a few meters (for extremely loosely focused pump radiation). Optionally, the gas flow 615 is provided by the gas delivery system into an evacuated or nearly evacuated space. The gas delivery system may comprise a gas nozzle 609, as shown in FIG. 6, which comprises an opening 617 in an exit plane of the gas nozzle 609. The gas flow 615 is provided from the opening 617. In almost all the prior arts, the gas nozzle has a cut tube geometry shape which is a uniform cylinder interior geometry shape, and the shape of the opening in the exit plane is round. An elongated opening has also been used as described in the patent application CN101515105B.

The dimensions of the gas nozzle 609 may conceivably also be used in scaled-up or scaled-down versions ranging from micrometer-sized nozzles to meter-sized nozzles. This wide range of dimensioning comes from the fact that the setup may be scaled such that the intensity of the pump radiation at the gas flow ends up in the particular range which may be beneficial for the emitted radiation, which requires different dimensioning for different pump radiation energies, which may be a pulse laser and pulse energies can vary from tens of microjoules to joules. Optionally, the gas nozzle 609 has a thicker wall to reduce nozzle deformation caused by the thermal expansion effect, which may be detected by e.g. a camera. The gas nozzle with thicker wall may produce a stable gas volume with reduced variation. Optionally, the illumination source comprises a gas catcher which is close to the gas nozzle to maintain the pressure of the chamber 601.

Due to interaction of the pump radiation 611 with the gas atoms of the gas flow 615, the gas flow 615 will convert part of the pump radiation 611 into the emitted radiation 613, which may be an example of the emitted radiation 342 shown in FIG. 6. The central axes of the emitted radiation 613 may be collinear with the central axes of the incident pump radiation 611. The emitted radiation 613 may have a wavelength in X-ray or EUV range, wherein the wavelength is in a range from 0.01 nm to 100 nm, optionally from 0.1 nm to 100 nm, optionally from 1 nm to 100 nm, optionally from 1 nm to 50 nm, or optionally from 10 nm to 20 nm.

In operation the emitted radiation 613 beam may pass through a radiation output 607 and may be subsequently manipulated and directed by an illumination system 603, which may be an example of the illumination system 312 in FIG. 6, to a substrate to be inspected for metrology measurements. The emitted radiation 613 may be guided, optionally focused, to a target on the substrate.

Because air (and in fact any gas) heavily absorbs SXR or EUV radiation, the volume between the gas flow 615 and the wafer to be inspected may be evacuated or nearly evacuated. Since the central axes of the emitted radiation 613 may be collinear with the central axes of the incident pump radiation 611, the pump radiation 611 may need to be blocked to prevent it passing through the radiation output 607 and entering the illumination system 603. This may be done by incorporating a filtering device 344 shown in FIG. 6 into the radiation output 607, which is placed in the beam path of the emitted radiation and that is opaque or nearly opaque to the pump radiation (e.g. opaque or nearly opaque to infrared or visible light) but at least partially transparent to the emitted radiation beam. The filter may be manufactured using zirconium or multiple materials combined in multiple layers. The filter may be a hollow, optionally an annular, block when the pump radiation 611 has a hollow, optionally an annular, transversal cross-sectional profile. Optionally, the filter is non-perpendicular and non-parallel to propagation direction of the emitted radiation beam to have efficient pump radiation filtering. Optionally, the filtering device 344 comprise a hollow block and a thin membrane filter such as an Aluminum(Al) or Zirconium(Zr) membrane filter.

Described herein are methods, apparatuses, and assemblies to obtain emitted radiation optionally at a high harmonic frequency of pump radiation. The radiation generated through the process, optionally the HHG which uses non-linear effects to generate radiation at a harmonic frequency of provided pump radiation, may be provided as radiation in metrology tools MT for inspection and/or measurement of substrates. The substrates may be lithographically patterned substrates. The radiation obtained through the process may also be provided in a lithographic apparatus LA, and/or a lithographic cell LC. The pump radiation may be pulsed radiation, which may provide high peak intensities for short bursts of time.

The pump radiation 611 may comprise radiation with one or more wavelengths higher than the one or more wavelengths of the emitted radiation. The pump radiation may comprise infrared radiation. The pump radiation may comprise radiation with wavelength(s) in the range of 800 nm to 1500 nm. The pump radiation may comprise radiation with wavelength(s) in the range of 900 nm to 1300 nm. The pump radiation may comprise radiation with wavelength(s) in the range of 100 nm to 1300 nm. The pump radiation may be pulsed radiation. Pulsed pump radiation may comprise pulses with a duration in the femtosecond range.

For some embodiments, the emitted radiation, optionally the high harmonic radiation, may comprise one or more harmonics of the pump radiation wavelength(s). The emitted radiation may comprise wavelengths in the extreme ultra-violet (EUV), soft X-Ray (SXR), and/or hard X-Ray (HXR) part of the electromagnetic spectrum. The emitted radiation 613 may comprise wavelengths in the range of 0.01 nm to 100 nm. The emitted radiation 613 may comprise wavelengths in the range of 0.1 nm to 100 nm. The emitted radiation 613 may comprise wavelengths in the range of 0.1 nm to 50 nm. The emitted radiation 613 may comprise wavelengths in the range of 1 nm to 50 nm. The emitted radiation 613 may comprise wavelengths in the range of 10 nm to 20 nm.

Radiation, such as high harmonic radiation described above, may be provided as source radiation in a metrology tool MT. The metrology tool MT may use the source radiation to perform measurements on a substrate exposed by a lithographic apparatus. The measurements may be for determining one or more parameters of a structure on the substrate. Using radiation at shorter wavelengths, for example at EUV, SXR and/or HXR wavelengths as comprised in the wavelength ranges described above, may allow for smaller features of a structure to be resolved by the metrology tool, compared to using longer wavelengths (e.g. visible radiation, infrared radiation). Radiation with shorter wavelengths, such as EUV, SXR and/or HXR radiation, may also penetrate deeper into a material such as a patterned substrate, meaning that metrology of deeper layers on the substrate is possible. These deeper layers may not be accessible by radiation with longer wavelengths.

In a metrology tool MT, source radiation may be emitted from a radiation source and directed onto a target structure (or other structure) on a substrate. The source radiation may comprise EUV, SXR and/or HXR radiation. The target structure may reflect, transmit and/or diffract the source radiation incident on the target structure. The metrology tool MT may comprise one or more sensors for detecting diffracted radiation. For example, a metrology tool MT may comprise detectors for detecting the positive (+1st) and negative (−1st) first diffraction orders. The metrology tool MT may also measure the specular reflected or transmitted radiation (0th order diffracted radiation). Further sensors for metrology may be present in the metrology tool MT, for example to measure further diffraction orders (e.g. higher diffraction orders).

HHG sources may comprise compact, high-brightness, laser-like sources which naturally produce a comb-like spectrum of short wavelength light which, for example, may be in the 8-20 nm wavelength range. Such wavelengths penetrate moderately (several hundred nanometers) into industrially relevant stacks while still reflecting sufficiently to allow the development of high throughput, highly sensitive metrology and/or inspection instruments. The broad spectrum produced by HHG sources is a particularly useful property for measurement applications due to the highly wavelength dependent contrast exhibited by many relevant materials in this wavelength range. All of these characteristics make HHG sources suitable for, for example, after develop (e.g., overlay) metrology (i.e., metrology on an exposed resist patterns prior to etch) on at-resolution features (features of a similar dimension as actual product, which includes metrology on the actual product); and direct edge placement error (EPE) measurements.

Figure 10:
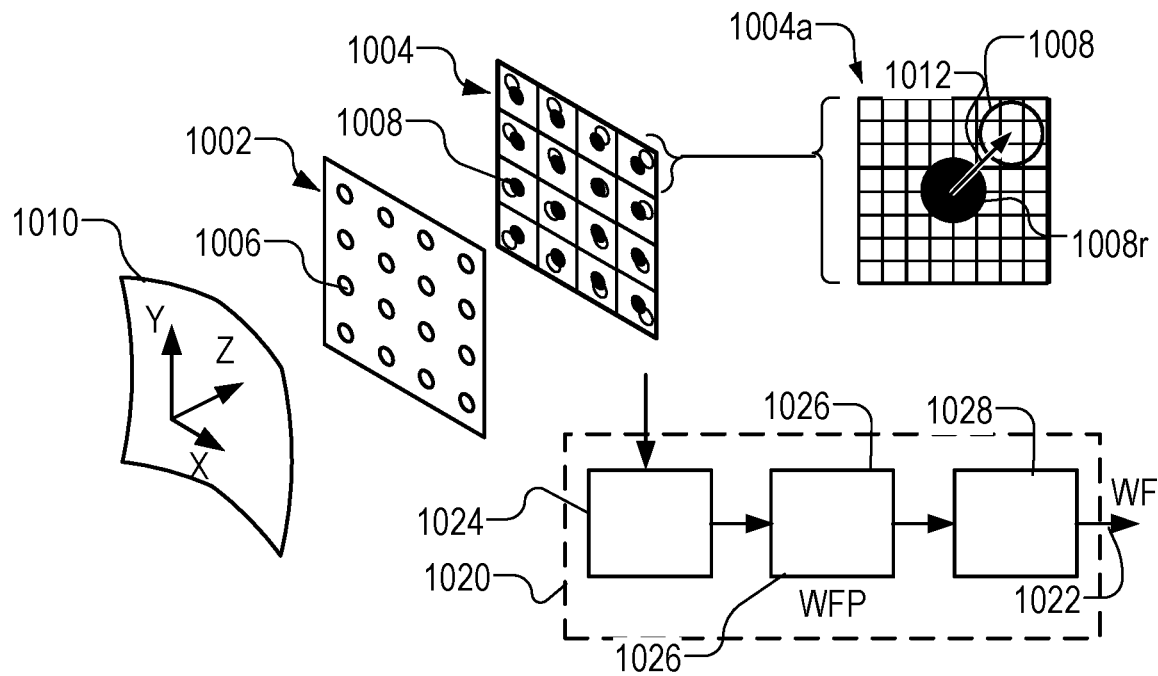
FIG. 10 illustrates the principle of operation of a wavefront sensor without spectral resolution.

FIG. 10 shows the principle of operation of a conventional Hartmann type wavefront sensor (without spectral resolution). An aperture array 1002 is positioned in the path of a beam of radiation, and optionally an image sensor 1004 in a detection plane. A detect may be placed in the detection plane, for example a CCD or CMOS image sensor, for detecting the radiation subsequent to the mask. Aperture array 1002 comprises for example a metal plate with apertures 1006 spaced in a regular array in a plane defined by dimensions X and Y. Radiation approaching the wavefront sensor nominally in the Z direction passes through the aperture array and so forms an array of spots 1008 on the detection plane, optionally on the image sensor 1004, also oriented in an X-Y plane. If the beam of radiation had an ideal flat wavefront, so that it comprised only parallel rays perfectly in phase and perfectly aligned with the Z axis, each spot would be formed exactly behind the corresponding aperture 1006. A real beam, on the other hand, will have some form of tilt and/or curvature, such as the convex wavefront 1010 illustrated in the drawing. In that case, the wavefront is tilted in a particular way at each location in the aperture array and the corresponding spot 1008 will be formed on the detection plane, optionally on the image sensor 1004 with a positional deviation dependent on that tilt. Relative positional deviations can be observed and measured, even when an absolute "zero deviation" position of the sots is no known.

An enlarged portion of image sensor 1004 is shown at 1004a, showing one spot 1008 (open circle) and also showing a reference position 1008r (solid circle) for the same spot. Image sensor 1004 comprises an array of photodetector elements (pixels) having sufficient spatial resolution (sufficient pixel density) that the deviation 1012 of the actual spot 1008 from the reference position 1008r can be detected and quantified in two dimensions, for each aperture 1006 of the aperture array. A wavefront processor 1020 receives image data from the image sensor 1004 and outputs wavefront information 1022. Wavefront processor 1020 will typically be implemented by programming a suitable programmable processor, and may operate for example in a number of stages. A first processing stage 1024 analyzes an image from image sensor 1004 to detect the positions of the spots 1008. A second stage 1026 compares the positions of the spots 1008 with their reference positions 1008r to determine a local tilt for the wavefront 1010 at each location in the aperture array. The third stage 1028 integrates and interpolates the array of local tilts to obtain a model of the entire wavefront. This wavefront model can be output as an example of wavefront information. It may be represented as an array of local tilt vectors, and/or as a parameterized model, for example using Zernike or other polynomial representations.

Such HHG-based metrology tools may be able to perform fine alignment of a focused, broadband SXR beam onto a small target of interest (e.g., 5-20 μm), with only <1% out of target energy tolerated. Curved mirrors may be used to focus such beams, typically re-imaging the SXR source with relatively low demagnification. Thus, the focal spot quality on the target may be very sensitive to both the fine alignment of these curved mirrors as well as to the SXR source quality itself.

Any wavefront sensor used to characterize either the HHG source or the focus at the target plane should measure a wavefront for each harmonic wavelength. Different colors may have different wavefronts. Since it is important to measure all the wavelengths simultaneously, it is not sufficient to narrow the source bandwidth (e.g., with spectral filters or multilayer mirrors) and use a narrowband wavefront sensing technique. This is because the HHG process naturally produces significant, wavelength dependent variation in the source. For example, virtual source positions may vary by several millimeters in the beam propagation direction optionally due to the fact that generation points of different colors may be different. To be able to optimize the focus on the target, all of these wavefronts may be measured. In addition, estimating the focal spot characteristics of a source with sub-μm sensitivity dictates a high spatial resolution.

A design of a wavefront sensor will be described herein for, for example, measuring the source wavefront in the far field, before any focusing optics or in the near field after focusing optics. Another application of the wavefront sensor is measuring the wavefront of the radiation scattered by the substrate. With this tool, source quality and fine alignment (e.g., via a deformable mirror) of an SXR instrument (or one that outputs any other wavelength band) can be measured and controlled. Having a wavefront sensor which is able to quickly provide this wavefront information means that source parameters such as one or more of: gas jet pressure, location with respect to the pump radiation focus, and pump radiation focus shape (if using a deformable mirror or spatial light modulator SLM) can be modified in a feedback loop for adaptive control of the output beam. The wavefront sensor may be capable of measuring broadband and/or narrowband radiation.

Measuring wavefronts in, for example, the EUV and/or SXR spectral region is challenging because of high absorption of these wavelengths by most materials, and the difficulty in fabricating suitable focusing optics. A known approach in the EUV/SXR regime is to use a Hartmann sensor, which is an array of apertures, to measure the local phase gradient. Such a sensor is described, for example, in Mercère et al., Opt. Lett. 28, 1534 (2003), Künzel et al., Appl. Opt. 54, 4745 (2015) and patent application EP1415133A1 (each of these documents is incorporated herein by reference). Another known approach in the EUV regime is an interferometric technique called phase-shifting point diffraction interferometry (e.g., described in Naulleau et al., Appl. Opt. 38, 7252 (1999), incorporated herein by reference). Two more recent, non-standard techniques include one based on single slit diffraction measured across the beam profile by scanning a slit (described in Frumker et al., Opt. Lett. 34, 3026 (2009) incorporated herein by reference). and a technique which uses the interference pattern between two identical beams and reconstructs the wavefront by a lateral shearing algorithm(described in Austin et al., Opt. Lett. 36, 1746 (2011) incorporated herein by reference). Furthermore, another wavefront sensor which uses a mask referred to as a spectral Hartmann mask (SHM) and which allows the measurement of multiple EUV wavelengths in a single camera exposure, is disclosed in patent application EP 3410211A1, incorporated herein by reference.

For beam characterization with both high spatial resolution and spectral sensitivity, none of the above methods are sufficient. Hartmann masks and interferometric methods do not have spectral sensitivity. Furthermore, the spatial resolution is limited to tens of µm by, in the case of a Hartmann mask, the distance between the apertures, and for the interferometric methods, the size of the reference aperture (also typically a few µm to maintain sufficient throughput).

Slit-scanning spectrometers are slow and inefficient as they only sample a fraction of the beam in each of a series of measurement points, excluding in-line usage in a feedback loop. Importantly, they also only measure 1D wavefronts at a time, thereby excluding the possibility of characterizing wavefront asymmetries such as astigmatism (unless the entire detection system is rotated over 90 degrees). Astigmatism can be readily written onto the HHG beam due to astigmatism in the pump laser, or it can be readily imposed by a small misalignment of the off-axis curved focusing optics (e.g., Kirkpatrick-Baez mirrors or toroidal mirrors), and therefore its measurement may be useful.

The SHM sensor is fast and has high spectral sensitivity, but suffers from low spatial resolution due to the distance between apertures, which is larger than for conventional Hartmann (CM) masks. In addition, both CMs and SHMs exhibit relatively low fill factors, required to unambiguously track diffraction from separate apertures, but resulting in low flux efficiency.

To summarize, the main problems which all methods have in common are: 1) they are not optimized for joint spatial and spectral sensitivity (and a trade-off always exists), 2) they are not optimized for measurement throughput (effectively using the available flux and detector bandwidth), and 3) their spatial resolution is directly limited either by the size of the structures in the mask or the distance between them, rather than the detection NA.

A class of optimized mask designs which may be used in combination with ptychography or any other suitable phase retrieval technique is proposed, which characterize the wavefronts of all harmonics in a HHG beam(e.g., in a wavelength range A=9-30 nm, but not limited to such a range) and which may have sub-µm lateral resolution over mm-scale fields of view. The concepts disclosed herein may be embodied in a mask design optimization for optimized performance in terms of wavefront and spectral sensitivity, when used in combination with ptychography.

A mask comprises a pattern to interact with the radiation. A wavefront sensing error metric may be used in optimizing masks for wavefront sensing. The wavefront sensing error metric may be a statistical proxy for an actual measure of the wavefront sensing error. For example the statistical proxy may be an entropy related parameter, optionally a parameter which is a combination of entropy of the pattern of the mask and entropy of a radiation detection pattern on a radiation detector/detection plane, optionally a combination of real and reciprocal space entropy, hereafter the combined spatial entropy metric. Partially opaque masks may be evaluated on a normalized scale, with masks having a value for the wavefront sensing error metric above a certain threshold deemed to be optimized within the scope of this disclosure.

Figure 11:
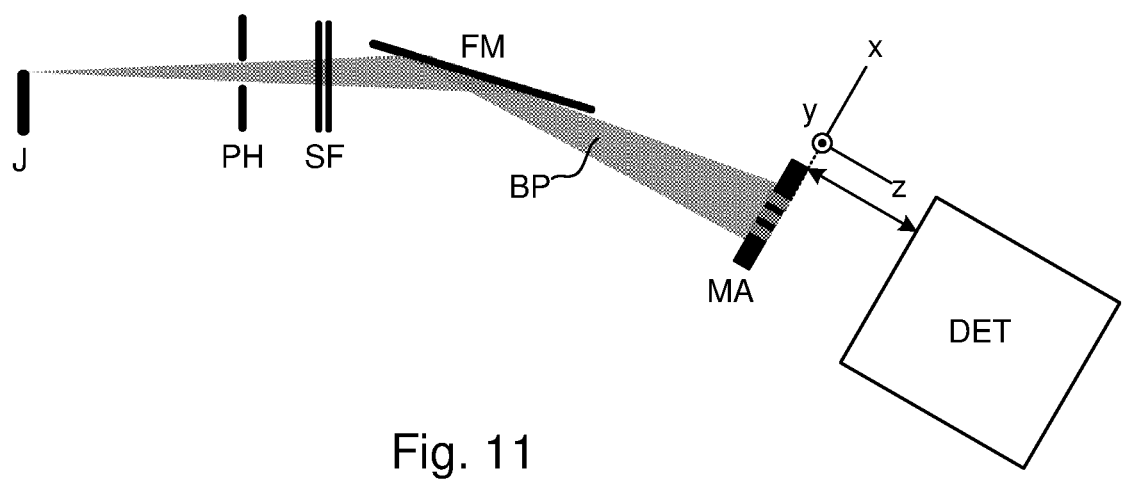
FIG. 11 depicts a setup for wavefront measurement.

FIG. 11 is a setup for wavefront measurement comprising a wavefront sensor arrangement according to an embodiment of the invention. As one example, FIG. 11 shows main elements of the EUV/SXR ptychographic wavefront sensor which can characterize the wavefront of a source, optionally a HHG source, using a movable mask and a detection, optionally a 2D detector, in a detection plane. An assembly, or called subsystem, of the wavefront sensor may comprise the mask and the detection plane.

The radiation impinging on the mask forms the radiation detection pattern. The radiation detection pattern of the radiation is generated on the detection plane or on the radiation detector. In one example, the HHG radiation is generated in the region of jet J which emits an HHG medium excited by a pump laser (not shown). A pinhole PH, spectral filters SF, folding mirror FM, mask MA (on a 2D scanning stage) and camera or detector DET are located in the beam path BP of the emitted radiation. Note that the folding mirror FM. pinhole PH and spectral filters SF are optional and the concepts disclosed herein may be performed without some or all of these elements. A basic embodiment may use only a broadband or HHG beam incident on a mask MA, optionally a moveable mask, optionally a moveable 2D mask, and a detection plane, optionally the camera/detector DET in transmission or reflection. The mask MA may be a transmissive or reflective element. Transmissive mask means that the pattern of the mask comprises two areas with different transmissivity of the radiation, while reflective mask means that the mask comprises two areas with different reflectivity of the radiation. Although specific reference may be made in this text to the use of transmissive (or reflective) element, it should be understood that the embodiments described herein may also be used for reflective (or transmissive) element. In a reflective embodiment, the mask MA may be used in an off-axis reflection mode geometry. The mask MA may (i.e., in a transmissive embodiment) comprise a partially opaque mask with apertures placed such to fulfill conditions for spectrally resolved wavefront sensing (explained in more detail below). This mask MA may be scanned through the beam in a controlled manner, with a diffraction pattern recorded in the detection plane, optionally on the detector DET for each mask position. A ptychography or other phase retrieval method/algorithm may process the measured diffraction data to retrieve wavefront information.

In principle, scanning a conventional Hartmann mask will lead to improved spatial resolution, however conventional Hartmann masks have inferior spatial and spectral resolution due to their spatial periodicity. To understand the proposed wavefront mask design approach, the optimization goals will be described and formulated mathematically.

Qualitatively, it is desirable that the mask have the following properties:
- have a significant transmissive/reflective area to maximize transmitted/reflected flux,
- make effective use of all the available detector pixels and its full dynamic range,
- have high sensitivity to spatial wavefront variations,
- have the ability to separate multiple wavelength components, and
- fulfill a set of oversampling conditions (described below) to enable wavefront reconstruction at sufficient resolution; e.g., via lensless imaging or data-driven reconstruction algorithms which enable blind deconvolution of the incident beam from the wavefront sensor, such as ptychography.

The inventors have discovered that all of these properties may be optimally fulfilled for masks which have a pattern comprising the mathematical property that it maximizes a combination (e.g., the sum or product) of the (e.g., normalized) real and reciprocal space spatial entropy. This combination is referred throughout the description as the combined spatial entropy metric. Existing masks only comprise a limited range of combined spatial entropy metric values. Disclosed herein are masks, wavefront sensors arrangements and optimization methods for such masks, which comprise/optimize the mask pattern such that the mask has a combined spatial entropy metric value above a certain threshold value. Note that because the combined spatial entropy metric value is determined by both the mask design and a pattern on the detector plane, when "combined spatial entropy metric for the mask" is referred, the detection plane is also involved. Therefore, the pattern of the mask is designed at least partly based on a requirement of the radiation detection pattern. The requirement may comprise that the entropy related parameter, optionally the parameter which is a combination of entropy of a pattern of the mask and entropy of a radiation detection pattern on a radiation detector/detection plane, optionally a combination of real and reciprocal space entropy, optionally the combined spatial entropy metric, is above a certain value.

The concepts of real and reciprocal space spatial entropy will now be described and how they influence wavefront sensor design. In physics, the extent to which a substance is spread out evenly in space is often quantified by its differential real space spatial entropy. Minimum spatial entropy indicates concentration at a single point, while maximum entropy is achieved when the substance is distributed evenly over all points in a considered domain. To fulfill the property of having a significant open area, the mask may have maximum real space entropy to enable maximum flux transmitted through a mask. Simultaneously, it is desirable to distribute the signal scattered from the mask such that it is evenly distributed over all camera pixels, to maximize the total recorded photon flux measured in a single diffraction pattern. Hence in addition to maximizing real space spatial entropy of the mask, it is an aim to maximize the spatial entropy of the pattern on the camera. The pattern on the detection place, optionally on the camera, is the Fourier transform of the pattern at the mask, and its entropy is called the reciprocal space spatial entropy. To make effective use of all the available detector pixels/dynamic range, the reciprocal space entropy may also be maximized. However, maximizing the real space entropy affects the reciprocal space entropy and vice versa. As an example, the maximum real space spatial entropy over a circular domain is achieved by an open circular aperture with maximum diameter inscribed into the allowed domain. However, this results in poor scattering properties with most of the diffracted signal concentrated in the center of the diffraction pattern, which is quantified by a very low reciprocal space entropy. What will be observed is a saturated central diffraction peak, while off-axis camera pixels record few photons, resulting in a poor signal to noise for high spatial frequency signal estimation. Similarly, in the limit of a point source-like mask, a spherical wave is generated resulting in maximum reciprocal space entropy while having minimum spatial entropy.

Mathematical definitions of the real and reciprocal space entropies discussed above will now be provided. In one embodiment, a mask function, optionally a binary mask function or a nearly binary mask function, is a noncontinuous structures. For instance, a Gaussian mask is a continuous mask and has a value of 1, which is not a good mask for wavefront measurement. In this text a binary mask function $m(x)$ is used as an example, for which equals the constant value A wherever the mask is transmissive and 0 wherever the mask is opaque, with the constant A chosen such that $m(x)$ is normalized such that $$\sum_{x \in D} |m(x)|^2 \cdot (\Delta x)^2 = 1.$$

$$S_{real} = -\sum_{x \in D} |m(x)|^2 \cdot \ln(|m(x)|^2) \cdot (\Delta x)^2 \qquad (1)$$

where ln is the natural logarithm, $x=(x_1, x_2)$ E D is shorthand notation for all two-dimensional position coordinates for which $m(x)$ is non-zero, $\Delta x = L/N$ is the real space pixel size. This assumes that in a computer representation, the field of view containing all non-zero elements of the binary mask is of size L and discretized by N pixels. $\Delta x$ is included in the definition of the differential entropy in order to normalize entropy values, thus enabling comparison of different wavefront sensor designs on a unified scale and independent of the specific discretization.

Similarly, the reciprocal space differential $S_{reciprocal}$ may be defined as:

$$S_{reciprocal} = -\sum_{q \in D} |\tilde{m}(q)|^2 \cdot \ln(|\tilde{m}(q)|^2)(\Delta q)^2 \qquad (2)$$

where $\Delta q=1/L$ and $\tilde{m}(q)$ is the two-dimensional spatial Fourier transform of $m(x)$. Here the summation is over the region $\tilde{D}$ in reciprocal space where the Fourier transform is nonzero and $\tilde{m}(q)$ is normalized such that $$\sum_{q \in \tilde{D}} |\tilde{m}(q)|^2 \cdot (\Delta q)^2 = 1.$$

The entropy may be normalized on a unified scale in order to compare spatial entropies of masks with different shapes and sizes. To this end, the entropy-variance inequality may be used (e.g., as described in Shannon, C. E. (1948). A mathematical theory of communication. The Bell system technical journal, 27 (3), 379-423; incorporated herein by reference); expressed by:

$$\frac{\exp(2S[X])}{2\pi e} \le \mathrm{Var}[X] \quad (3)$$

where X is a spatial random variable, S denotes entropy ($S_{real}$ or $S_{reciprocal}$) as defined above, and Var[X] denotes the second (spatial) moment of the random variable X. This may be rewritten as:

$$S[X] \le \frac{1}{2}\log(2\pi e) + \frac{1}{2}\log \mathrm{Var}[X] \quad (4)$$

It is proposed to use this upper bound to normalize the entropy to a unified scale:

$$S_{norm}[X] := \frac{2S[X]}{\log(2\pi e) + \log \mathrm{Var}[X]} \le 1 \quad (5)$$

The mask and its Fourier transform may each be treated as bivariate random variables X, Y and $Q_x$, $Q_y$ in real and reciprocal space, respectively. As such, the normalization treatment described by Equation (5) can be performed to obtain normalized entropies for each of the spatial random variables corresponding to the real and reciprocal space differential entropies, i.e.: $S_{norm}=S_{norm,x}[X]$, $S_{norm,y}[Y]$, $S_{norm,Qx}[Q_x]$, $S_{norm,Qy}[Q_y]$.

It is further proposed to use a combination of these normalized entropies in each random variable, as the combined spatial entropy metric (or wavefront sensing error metric) to evaluate the total entropy of masks on a unified scale. For example the product of these normalized entropies may be used. Therefore methods disclosed herein comprise optimizing a binary mask (i.e., optimizing the binary pattern of a mask comprising a binary pattern) such that it has a maximized combined spatial entropy metric, or at least a combined spatial entropy metric above a threshold value. Apparatuses disclosed herein comprise such masks and wavefront sensor devices comprising such masks.

In a specific example, the combined spatial entropy metric may be the product Snormprod of the normalized entropies in each random variable, and the threshold may be 0.8; i.e., expressed mathematically:

$$S_{normprod}=S_{norm,x}[X]S_{norm,y}[Y]S_{norm,Qx}[Q_x]S_{norm,Qy}[Q_y] \ge 0.8 \quad (6)$$

Conventional Hartmann masks and other prior art masks have an equivalent combined spatial entropy metric below this threshold. In other embodiments, this threshold may be 0.83, 0.85, 0.88 or 0.9.

The principle that an optimal mask for wavefront sensing comprises a combination of high real space entropy and high reciprocal space entropy stems from the observation that such a combination optimizes both mask transmission and detection efficiency.

Figure 12:
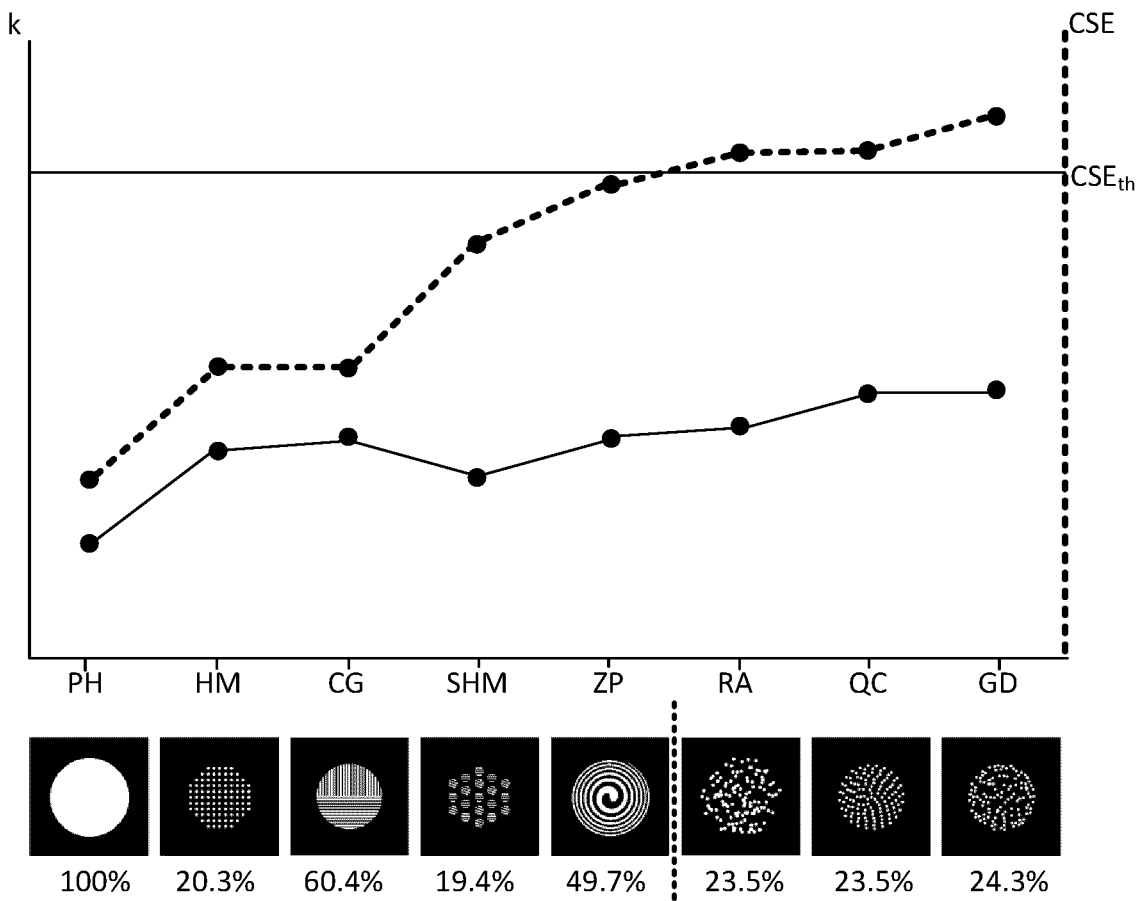
FIG. 12 is a plot of root mean square wavefront sensing error k and the combined spatial entropy metric for several binary masks as wavefront sensors.

FIG. 12 is a plot of root mean square wavefront sensing error k, which is a direct wavefront sensing error metric (first y axis-solid line) and the combined spatial entropy metric CSE or proposed (proxy) wavefront sensing error metric (second y axis-dotted line) for several binary masks as wavefront sensors. The plot describes the (simulated) performance for each of these masks. The masks comprise a first group of five known masks with known binary patterns: a single aperture or pinhole PH, a conventional Hartmann mask HM, a crossed gratings mask CG, a spectral Hartmann mask SHM, a spiral zone plate mask ZP; and a second group of masks with binary patterns optimized according to the concepts disclosed herein:

a randomized apertures mask RA, a quasi-crystalline aperture array mask QC and a mask comprising an aperture array optimized using a greedy search algorithm GD.

The illustrated data relates to a simulation of the experimental setup of FIG. 11, assuming an EUV spectrum with 9 harmonics (with a Gaussian spectral envelop of 15 nm full width at half maximum) in the range 10-20 nm. The two plots show a correlation between the combined spatial entropy metric CSE (dotted line) and root mean square wavefront sensing error (solid line). The root mean square wavefront sensing error describes the accuracy of the wavefront reconstruction obtained by a ptychography measurement, as quantified by the value of k defined below. The plot illustrates that the higher the value for the combined spatial entropy metric, the more accurate the reconstructed wavefront. In particular, the three new mask designs RA, QC, GD with high combination spatial entropy metric (above a threshold value $CSE_{th}$) enable accuracies which are not possible with conventional mask designs.

The spectral root mean square wavefront sensing error $E(\lambda)$ (rmsWFSE) may be defined as:

$$E(\lambda) = \sqrt{\frac{\sum_k I(x, \lambda)[\phi_{true}(x, \lambda) - \phi_{est}(x, \lambda)]^2}{\sum_k I(x, \lambda)}}. \quad (7)$$

$E(\lambda)$, which has units of radians, may be converted to units of wavelengths ($\delta W$) using the relation:

$$\delta W = \frac{\lambda}{k} = \frac{E(\lambda)}{2\pi} \cdot \lambda. \quad (8)$$

Thus, a high value for k on the left y-axis in FIG. 12 indicates a high wavefront sensing accuracy, or equivalently low average spectral wavefront estimation error on the order of $\lambda/k$. Each point on the (solid) line shows the rms WFSE averaged over all data sets and wavelengths simulated for each respective wavefront sensor. The threshold value CSEt corresponds to a combined spatial entropy metric (as described in equation (6)) of 0.8; i.e., anything above or on this line corresponds to $S_{normprod} \ge 0.8$. Based on the observed correlation of rms WFSE with the combined spatial entropy metric, it is proposed to use the combined spatial entropy metric as a statistical proxy to estimate rms WFSE.

The simulations summarized by FIG. 12 support the observation that masks with maximum combined spatial entropy result in optimized wavefront reconstruction quality. However, as already mentioned, another consideration to be taken into account in wavefront sensor design are sampling considerations. Every set of two pinholes in a binary mask creates a sinusoidal signal in the camera plane and the coherent superposition of all these sinusoidal signal synthesizes the electric field in the detector plane. The further the separation between each set of two pinholes in the mask plane (real space), the smaller the spatial fringe period in the detector plane, bearing the risk of undersampling the diffraction intensity.

Figure 13:
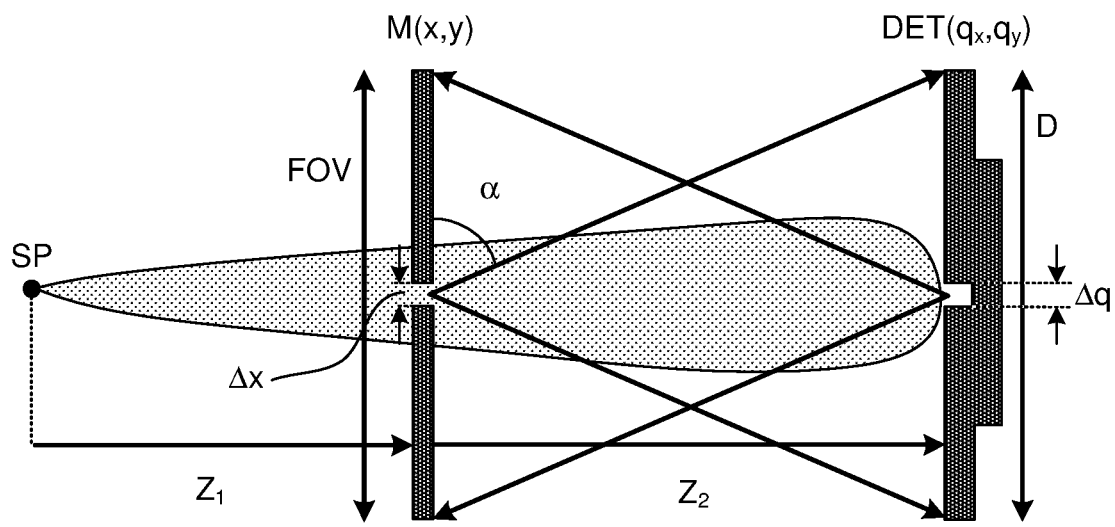
FIG. 13 depicts a wavefront sensor arrangement in terms of key sampling parameters.

FIG. 13 illustrates the resulting sampling conditions required to sample a diffraction intensity produced by a mask M (x,y) of lateral size FOV. The maximum wavefront curvature that can be detected at detector plane DET ($q_x,q_y$) without aliasing is a phase shift of x per mask resolution element Ax. The distance $z_1$ to the source point SP combined with the spatial resolution and Field-of-View (FOV) at the mask plane then determines the achievable spatial resolution at the HHG source position SP. More specifically the sampling requirements following from discretization are:

$$\Delta x = \lambda_{min} z/_D; \Delta q = \lambda_{min} z/FOV \ FOV < \lambda_{min} z/\Delta q \quad (9)$$

where $\lambda_{min}$ is the shortest wavelength (which determines the allowable FOV; i.e., the maximum extent over which its transmissivity or reflectivity is allowed to be nonzero) and z is the sample to camera distance. This shows that the FOV of the wavefront sensor is restricted; the wavefront sensor may be smaller than the product of the smallest wavelength and the wavefront-sensor-to-detector-distance divided by the detector pixel size (to comply with sampling limitations following from the Shannon-Nyquist theorem).

It can be seen from the FIG. 12 that the ptychographic reconstruction algorithm which results in the highest rmsWFSE is that which uses a mask based on a greedy entropy maximization algorithm. This algorithm may comprise the following steps:
a) Start with a mask comprising apertures at random locations.
b) Select n-th aperture of the mask.
c) Evaluate combined spatial entropy metric for mask by determining values for this n-th aperture in its present place, and moved to other adjacent places (e.g., each of one pixel North/East/South/West).
d) Select new aperture position as the one which yields highest total entropy of the five possible masks resulting from step c).
e) Increase n by 1 and return to step b).

Figure 14A:
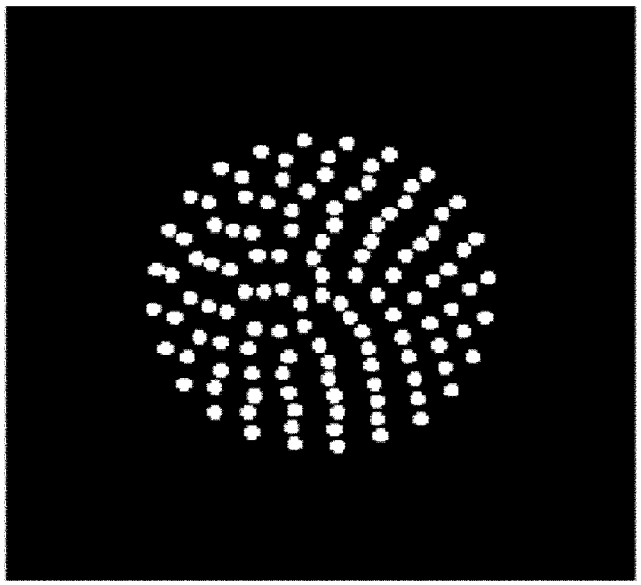
FIGS. 14A and 14B illustrate two types of masks according to embodiments of the invention.
Figure 14:
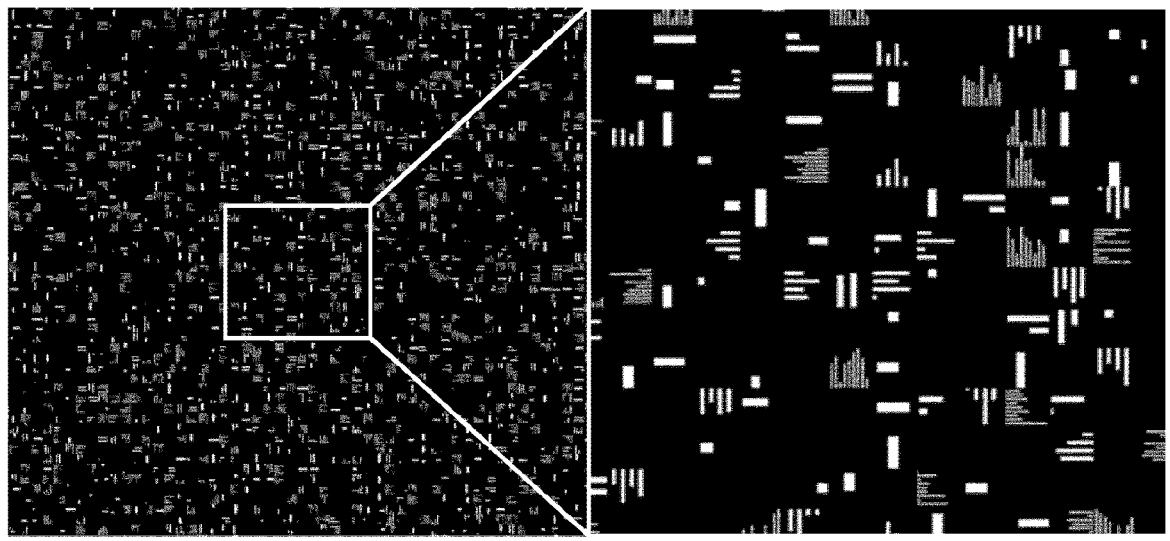

In addition to the greedy mask describe above, two other example masks within the scope of this disclosure are illustrated in FIG. 14 FIG. 14 (a) illustrates a quasi-crystalline mask pattern, which is ordered, but aperiodic under translation. This particular example has all apertures located on concentric circles with increasing diameter, but is just one example out of many possible QCs. FIG. 14 (b) illustrates a mask pattern which may be used where design rules restrict mask design options to those comprising with only rectangles including horizontal and vertical rectangles. An entropy maximization design approach may be used to identify masks with suitable scattering properties.

Compared to other wavefront sensing methods, masks comprising a high value (above a threshold as described) for the combined spatial entropy metric, in ptychography or a related metrology method provides performance superior to existing state of the art technology such as Hartmann masks.

The combined spatial entropy metric is an intrinsic property of any binary wavefront sensor as it only depends on the mathematical description of the mask itself (and its Fourier transform). It is believed that any mask designed according to this principle will perform better than existing masks, in terms of one or both of sensitivity and measurement efficiency (accuracy per detected number of photons).

The wavefront sensor can support improved monitoring and control of a radiation source arrangement. The wavefront sensor can support more accurate calculation of measurements, when a metrology apparatus is dependent on the qualities of a radiation beam produced by an arrangement. Sufficiently fast measurement to provide complete EUV beam information on timescale of an overlay measurement, for example, in high volume manufacturing.

The principles of the present disclosure may be applied in any wavelength range, although it is particularly applicable in the EUV/soft-X-ray region where source stability is a needed development, and where optical wavefront sensing methods such as interferometry are problematic.

The mask or aperture array can be made transmissive or reflective, without deviating from the principles and therefore an off-axis reflection mode geometry is possible, for example. A variant that works in reflection may comprise for example a grazing incidence conical diffraction configuration. This has advantages in terms of manufacturability and robustness, and gives a completely different parameter space for diffraction geometry and contrast. How the oversampling conditions work out in reflection mode is provided in the paper C. L. Porter, et. al. "General-purpose, wide field-of-view reflection imaging with a tabletop 13 nm light source." Optica 4, No. 12, 1552-1557 (2017). An analysis of conical diffraction of EUV radiation in grazing incidence is provided in the paper C. Braig. L. Fritzsch, T. Käsebier, E.-B. Kley, C. Laubis, Y. Liu, F. Scholze, and A. Tünnermann, "An EUV beamsplitter based on conical grazing incidence diffraction." Opt. Express 20, 1825-1838 (2012). Note that the oversampling conditions determining the allowed field of view of the wavefront sensor in reflection mode is not as simple as that described above (Inequality (9)) and will depend on the incidence angle. More detail may be found in the reference (incorporated herein by reference): C. L. Porter, et. al. "General-purpose, wide field-of-view reflection imaging with a tabletop 13 nm light source." Optica 4, No. 12, 1552-1557 (2017).

Implementation of the wavefront processing can be straightforward. Diffraction spots corresponding to a single wavelength are localized by a chosen numerical method, after which the wavefront reconstruction for each spectral component can proceed through established conventional reconstruction routines for Hartmann/Shack-Hartmann wavefront sensors. The concepts for wavefront sensing may comprise those described in relation to FIG. 10.

The improved wavefront information obtained using the concepts disclosed herein may be used. for example, to improve radiation source properties based on the measured wavefront (e.g., in a feedback method), or to adjust downstream optics to compensate for measured wavefront imperfections (e.g., in a feedforward method).

Optionally, the sensor can be scanned relative to the beam to increase the spatial resolution of the wavefront, e.g. if the desired spectral range and spectral resolution demand a large spacing between the individual holes/gratings. Compared to other scanning configurations, the inherent spatial resolution of the wavefront sensor means that the required scanning range is small (about the distance between the apertures).

Modelling of the expected diffraction by the aperture array would extend the ability to characterize complex wavefronts and complex spectra. For example, understanding the shape of every spot (which relates to the shape of the apertures), allowing a more precise determination of the center positions.

The above-mentioned embodiments may be used in FIG. 11. One or more of the features of the embodiment described with respect to FIG. 11, may also be present in the above-mentioned embodiments as appropriate.

The principles of the present disclosure can be applied with EUV, SXR and/or HXR sources such as high-harmonic generation sources, liquid metal jet source, inverse Compton scattering (ICS) source, plasma channel source, magnetic undulator source and free electron laser (FEL) source, but also with less coherent sources such as (spatially filtered) plasma discharges.

In the application to metrology, the target structures measured may be metrology targets specifically designed and formed for the purposes of measurement, in other embodiments, properties may be measured on targets which are functional parts of devices formed on the substrate. Many devices have regular, periodic structures akin to a grating. The term "target", "grating" or "periodic structure" of a target as used herein does not require that the applicable structure has been provided specifically for the measurement being performed. Further, pitch P of the metrology target is close to the resolution limit of the optical system of the measurement tool, but may be much larger than the dimension of typical product features made by a patterning process in the target portions C. In practice the features and/or spaces of the gratings may be made to include smaller structures similar in dimension to the product features.

The illumination source may be provided in for example a metrology apparatus MT, an inspection apparatus, a lithographic apparatus LA, and/or a lithographic cell LC.

The properties of the emitted radiation used to perform a measurement may affect the quality of the obtained measurement. For example, the shape and size of a transverse beam profile (cross-section) of the radiation beam, the intensity of the radiation, the power spectral density of the radiation etc., may affect the measurement performed by the radiation. It is therefore beneficial to have a source providing radiation that has properties resulting in high quality measurements.

Although specific reference may be made in this text to embodiments in the context of a binary mask, embodiments may be used in other masks including a nearly binary mask which may be a reflective or transmissive mask. The transmissive nearly binary mask is defined such that where the transmissive areas have transmissivity other than 1 optionally from 0.1 to 1, optionally from 0.5 to 1 or optionally from 0.75 to 1. For example, opaque part of the transmissive nearly binary mask comprises metal, and the transmissive part comprise silicon nitride membrane that is significantly transparent to EUV. The reflective nearly binary mask is defined such that where the substrate has low reflectivity (for example, an AR coating, or a material with low reflectivity) while the reflective mask features have high reflectivity. The nearly binary mask may be a reflective mask where the radiation is reflected by the mask. Because that no substrate has zero reflectivity, the reflective mask is the near binary mask.

The above-mentioned embodiments may also be used in a lithographic apparatus, optionally an extreme ultraviolet (EUV) lithographic apparatus with a EUV source, where printing is performed using radiation of a wavelength less than 20 nm, for example 13.5 nm. In one embodiment, the wavefront sensor may be used for measuring a wavefront of EUV radiation generated by the EUV source or any other radiations used in the EUV lithographic apparatus.

According to an aspect of the invention, there is provided a computer program product comprising instructions which, when executed on at least one processor, cause the at least one processor to control an apparatus to carry out a method according to any described herein. According to an aspect of the invention, there is provided a non-transitory computer program product comprising machine-readable instructions therein, the instructions, upon execution by a computer system, configured to cause the computer system to at least cause performance of a method according to any described herein.

Further embodiments are disclosed in the subsequent numbered clauses:

1. A wavefront sensor for measuring a wavefront of radiation; comprising:
   a mask comprising a pattern located in the path of said radiation; and
   a radiation detector for detecting said radiation subsequent to said mask;
   wherein a value for a normalized combined spatial entropy metric for the mask is equal or greater than 0.8.

2. A wavefront sensor as claimed in clause 1, wherein the combined spatial entropy metric comprises a combination of a real spatial entropy metric relating to the distribution of said radiation transmitted or reflected by said mask and a reciprocal spatial entropy metric relating to the distribution of said radiation on said radiation detector.

3. A wavefront sensor as claimed in clause 2, wherein the real spatial entropy metric and reciprocal spatial entropy metric each comprise a differential entropy.

4. A wavefront sensor as claimed in clause 3, wherein the combined spatial entropy metric comprises a product of the normalized real differential entropies of each variable of a pair of bivariate random variables in real space and the normalized reciprocal differential entropies of each variable of a pair of bivariate random variables in reciprocal space, wherein optionally a real space differential entropy $S_{real}$ is defined as:

$$S_{real} = -\sum_{x \in D} |m(x)|^2 \cdot \ln(|m(x)|^2) \cdot (\Delta x)^2$$

where ln is natural logarithm, $x=(x_1, x_2) \in D$ is shorthand notation for all two-dimensional position coordinates for which $m(x)$ is non-zero, $\Delta x = L/N$ is real space pixel size, and wherein optionally a reciprocal space differential $S_{reciprocal}$ may be defined as:

$$S_{reciprocal} = -\sum_{q \in \tilde{D}} |\tilde{m}(q)|^2 \cdot \ln(|\tilde{m}(q)|^2)(\Delta q)^2 \quad (2)$$

where $\Delta q = 1/L$ and $\tilde{m}(q)$ is two-dimensional spatial Fourier transform of $m(x)$, the summation is over the region $\tilde{D}$ in reciprocal space where the Fourier transform is nonzero and $\tilde{m}(q)$ is normalized such that $$\sum_{q \in \tilde{D}} |\tilde{m}(q)|^2 \cdot (\Delta q)^2 = 1.$$

5. A wavefront sensor as claimed in any preceding clause, wherein combined spatial entropy metric is dependent only on a mathematical description of said pattern.

6. A wavefront sensor as claimed in any preceding clause, wherein said mask is mounted to be moveable with respect to a source of the radiation.

7. A wavefront sensor as claimed in clause 6, further comprising a processor being operable to perform a phase retrieval method to process measured diffraction data from the radiation detector to retrieve wavefront information, wherein optionally the phase retrieval method is ptychography 8. A wavefront sensor as claimed in any preceding clause, wherein the value for a normalized combined spatial entropy metric for the mask is equal or bigger than 0.85.

9. A wavefront sensor as claimed in any preceding clause, wherein the value for a normalized combined spatial entropy metric for the mask is equal or bigger than 0.88.

10. A wavefront sensor as claimed in any preceding clause, wherein said pattern is defined in accordance with a greedy combined spatial entropy metric maximization algorithm.

11. A wavefront sensor as claimed in any of clauses 1 to 9, wherein said pattern is defined in accordance with a quasi-crystalline pattern.

12. A wavefront sensor as claimed in any of clauses 1 to 9, wherein said pattern is defined in accordance with a randomized pattern.

13. A wavefront sensor as claimed in any preceding clause, wherein said pattern comprises only rectangles.

14. A wavefront sensor for measuring a wavefront of a radiation; comprising:
a mask comprising a pattern located in path of the radiation to interact with the radiation; and
wherein the radiation impinging on the mask forms a radiation detection pattern on a radiation detector subsequent to the mask,
wherein the pattern of the mask is designed at least partly based on a requirement of the radiation detection pattern.

15. A wavefront sensor as claimed in clause 14, wherein the mask is mounted to be moveable with respect to a source of the radiation.

16. A wavefront sensor as claimed in clause 15, further comprising a processor being operable to perform a phase retrieval method to process measured diffraction data from the radiation detector to retrieve wavefront information.

17. A wavefront sensor as claimed in clause 16, wherein the phase retrieval method is ptychography.

18. A wavefront sensor as claimed in any of clauses 14 to 17, wherein said pattern is defined in accordance with a quasi-crystalline pattern.

19. A wavefront sensor as claimed in any of clauses 14 to 17, wherein said pattern is defined in accordance with a randomized pattern.

20. A wavefront sensor as claimed in any preceding clause, wherein said pattern comprises only rectangles.

21. A radiation source arrangement operable to generate a beam of radiation, the radiation source arrangement further comprising:
a wavefront sensor as claimed in any preceding clause; and
a processor for determining at least one operating condition of the radiation source arrangement and/or at least one optical element downstream of the radiation source arrangement based at least partly on the measured wavefront.

22. A radiation source arrangement as claimed in clause 21, wherein the generated beam of radiation includes wavelengths shorter than 100 nm, optionally in the range from 5 to 30 nm, and optionally in the range from 10 nm to 20 nm.

23. A radiation source arrangement as claimed in clause 21 or 22, arranged to cause an interaction between pump radiation and a medium and thereby to generate said beam of radiation as broadband radiation by higher harmonic generation.

24. A radiation source arrangement as claimed in clause 23, further comprising a controller for adjusting at least one operating parameter of the radiation source arrangement automatically in response at least partly to the operating condition determined by the processor.

25. A radiation source arrangement as claimed in clause 24, wherein the adjusted operating parameter is a pump operating parameter of a pump source and/or pump beam delivery system of the pump radiation, 26. A radiation source arrangement as claimed in clause 25, wherein the pump operating parameter is one or more of pulse intensity or duration beam width, an axial focus position, a transverse focus position or a wavefront.

27. A radiation source arrangement as claimed in clause 24 or 25, wherein the medium is a gas jet and the adjusted operating parameter is an operating parameter of a gas delivery system to the gas jet.

28. An inspection apparatus comprising an illumination system for delivering inspection radiation to a target structure and a detection system for detecting said inspection radiation after interaction with the target structure, and wherein the illumination system includes a radiation source arrangement as claimed in any of clauses 21 to 27, the generated beam of radiation being used as said inspection radiation.

29. An inspection apparatus as claimed in clause 21 wherein the inspection radiation includes wavelengths shorter than 100 nm, optionally in the range from 5 to 30 nm, and optionally in the range from 10 nm to 20 nm.

30. An inspection apparatus as claimed in clause 28 or 29, further comprising a processing arrangement for determining a property of the target structure based on detected inspection radiation.

31 An inspection apparatus as claimed in clause 30, wherein said processing arrangement is further arranged to calculate a first performance parameter of a lithographic process based at least partly on the determined property of the target structure.

32. An inspection apparatus as claimed in clause 31, wherein said processing arrangement is arranged to determine said property of the target structure and/or said first performance parameter based further on an output of the wavefront sensor.

33. An inspection apparatus as claimed in any of clauses 28 to 32, comprising one of a scatterometer, an alignment sensor or a leveling sensor.

34. A method of optimizing a pattern of a mask for use in a wavefront sensor; the method comprising:
determining a combined spatial entropy metric for the mask defined by the pattern according to a plurality of configurations; and
selecting a mask based on said combined spatial entropy metric.

35. A method as claimed in clause 34, comprising selecting a mask which has a combined spatial entropy metric which is equal or greater than a threshold value.

36. A method as claimed in clause 34 or 35, wherein the threshold value is 0.8 for a normalized combined spatial entropy metric.

37. A method as claimed in clause 34 or 35, wherein the threshold value is 0.85 for a normalized combined spatial entropy metric.

38. A method as claimed in clause 34 or 35, wherein the threshold value is 0.88 for a normalized combined spatial entropy metric.

39. A method as claimed in any of clauses 34 to 38, comprising selecting the mask which has a maximized combined spatial entropy metric.

40. A method as claimed in any of clauses 34 to 39, comprising defining said pattern so as to maximize the combined spatial entropy metric.

41. A method as claimed in clause 40, wherein said defining said pattern is performed in accordance with a greedy combined spatial entropy metric maximization algorithm.

42. A method as claimed in any of clauses 34 to 40, wherein said pattern is defined in accordance with a quasi-crystalline pattern.

43. A method as claimed in any of clauses 34 to 40, wherein said pattern is defined in accordance with a randomized pattern.

44. A method as claimed in any of clauses 34to 43, wherein said pattern comprises only rectangles.

45. A method as claimed in any of clauses 34to 44, wherein the combined spatial entropy metric comprises a combination of a real spatial entropy metric and a reciprocal spatial entropy metric.

46. A method as claimed in any of clauses 34to 45, wherein the combined spatial entropy metric comprises a normalized combined spatial entropy metric.

47. A method as claimed clause 46, wherein the real spatial entropy metric and reciprocal spatial entropy metric each comprise a differential entropy.

48. A method as claimed clause 46 or 47, wherein the combined spatial entropy metric comprises a product of the normalized real differential entropies of each variable of a pair of bivariate random variables in real space and the normalized reciprocal differential entropies of each variable of a pair of bivariate random variables in reciprocal space.

49. A method as claimed in any of clauses 34to 48, wherein the combined spatial entropy metric is dependent only on a mathematical description of said pattern.

50. A method of designing a pattern of a mask for use in a wavefront sensor for a radiation, wherein the pattern of the mask is designed at least partly based on a requirement of a radiation detection pattern of the radiation, and wherein the radiation detection pattern is generated on a detection plane subsequent to the mask.

51. A non-transitory computer program product comprising machine-readable instructions therein, the instructions, upon execution by a computer system, configured to cause the computer system to at least cause performance of the method of any of clauses 34-50.

52. Use of a mask with a pattern designed according to any of clauses 34-50 in combination with a phase retrieval method.

53. Use of a mask with a pattern designed according to clause 52, wherein the phase retrieval method is ptychography.

54. A computer program product comprising machine-readable instructions for causing a processor to perform the method according to any of clauses 34 to 50.

55. An assembly for a wavefront sensor comprising a detection plane and a mask with a pattern and
wherein a normalized combined spatial entropy metric for the mask has a value equal or greater than 0.8.

56. An assembly as claimed in clause 55, wherein the combined spatial entropy metric comprises a combination of a real spatial entropy metric relating to the distribution of said broadband radiation transmitted by said mask and a reciprocal spatial entropy metric relating to the distribution of said broadband radiation on said detector.

57. An assembly as claimed in clause 56, wherein the real spatial entropy metric and reciprocal spatial entropy metric each comprise a differential entropy.

58. An assembly as claimed in clause 57, wherein the combined spatial entropy metric comprises a product of the normalized real differential entropies of each variable of a pair of bivariate random variables in real space and the normalized reciprocal differential entropies of each variable of a pair of bivariate random variables in reciprocal space.

59. An assembly for a wavefront sensor comprising a detection plane and a mask with a pattern located in path of a radiation to interact with the radiation, wherein the radiation impinging on the mask forms a radiation detection pattern on the detection plane subsequent to the mask, and wherein the pattern of the mask is designed at least partly based on a requirement of the radiation detection pattern.

60. A wavefront sensor as claimed in any of wavefront sensor clauses above, wherein the pattern is a noncontinuous pattern.

61. A wavefront sensor as claimed in any of wavefront sensor clauses above, wherein the pattern is a binary pattern.

62. A wavefront sensor as claimed in any of wavefront sensor clauses above, wherein the pattern is a nearly binary pattern.

63. A wavefront sensor as claimed in any of wavefront sensor clauses above, wherein the pattern of the mask comprises two areas with different transmissivity of the radiation.

64. A wavefront sensor as claimed in any of wavefront sensor clauses above, wherein the mask comprises two areas with different reflectivity of the radiation.

65. A wavefront sensor as claimed in any of clauses 14-20, wherein the requirement comprises that an entropy related parameter, optionally a parameter which is a combination of entropy of the pattern of the mask and entropy of the radiation detection pattern, optionally a combination of real and reciprocal space entropy, optionally a combined spatial entropy metric, is above a value.

66. A wavefront sensor as claimed in clause 65, wherein the value is 0.8, optionally 0.85 and optionally 0.88.

Although specific reference may be made in this text to the use of lithographic apparatus in the manufacture of ICs, it should be understood that the lithographic apparatus described herein may have other applications. Possible other applications include the manufacture of integrated optical systems, guidance and detection patterns for magnetic domain memories, flat-panel displays, liquid-crystal displays (LCDs), thin-film magnetic heads, etc.

Although specific reference may be made in this text to embodiments in the context of a lithographic apparatus, embodiments may be used in other apparatus. Embodiments may form part of a mask inspection apparatus, a metrology apparatus, or any apparatus that measures or processes an object such as a wafer (or other substrate) or mask (or other patterning device). These apparatuses may be generally referred to as lithographic tools. Such a lithographic tool may use vacuum conditions or ambient (non-vacuum) conditions.

Although specific reference may be made in this text to embodiments in the context of an inspection or metrology apparatus, embodiments may be used in other apparatus. Embodiments may form part of a mask inspection apparatus, a lithographic apparatus, or any apparatus that measures or processes an object such as a wafer (or other substrate) or mask (or other patterning device). The term "metrology apparatus" (or "inspection apparatus") may also refer to an inspection apparatus or an inspection system (or a metrology apparatus or a metrology system). E.g. the inspection apparatus that comprises an embodiment may be used to detect defects of a substrate or defects of structures on a substrate. In such an embodiment, a characteristic of interest of the structure on the substrate may relate to defects in the structure, the absence of a specific part of the structure, or the presence of an unwanted structure on the substrate.

Although specific reference may have been made above to the use of embodiments in the context of optical lithography, it will be appreciated that the invention, where the context allows, is not limited to optical lithography and may be used in other applications, for example imprint lithography.

While the targets or target structures (more generally structures on a substrate) described above are metrology target structures specifically designed and formed for the purposes of measurement, in other embodiments, properties of interest may be measured on one or more structures which are functional parts of devices formed on the substrate. Many devices have regular, grating-like structures. The terms structure, target grating and target structure as used herein do not require that the structure has been provided specifically for the measurement being performed. Further, pitch of the metrology targets may be close to the resolution limit of the optical system of the scatterometer or may be smaller, but may be much larger than the dimension of typical non-target structures optionally product structures made by lithographic process in the target portions C. In practice the lines and/or spaces of the overlay gratings within the target structures may be made to include smaller structures similar in dimension to the non-target structures.

While specific embodiments have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

Although specific reference is made to "metrology apparatus/tool/system" or "inspection apparatus/tool/system", these terms may refer to the same or similar types of tools, apparatuses or systems. E.g. the inspection or metrology apparatus that comprises an embodiment of the invention may be used to determine characteristics of structures on a substrate or on a wafer. E.g. the inspection apparatus or metrology apparatus that comprises an embodiment of the invention may be used to detect defects of a substrate or defects of structures on a substrate or on a wafer. In such an embodiment, a characteristic of interest of the structure on the substrate may relate to defects in the structure, the absence of a specific part of the structure, or the presence of an unwanted structure on the substrate or on the wafer.

Although specific reference is made to HXR, SXR and EUV electromagnetic radiations, it will be appreciated that the invention, where the context allows, may be practiced with all electromagnetic radiations, includes radio waves, microwaves, infrared, (visible) light, ultraviolet, X-rays, and gamma rays.

The invention claimed is:

1. A method comprising:
scanning a moveable mask through a radiation;
detecting patterns of the radiation scattered by the mask at different mask positions to obtain a measured data;
processing the measured data using ptychography; and
retrieving wavefront information of the radiation.

2. The method of claim 1, wherein the mask is mounted on a 2D scanning stage.

3. The method of claim 1, wherein the detected patterns are diffraction patterns of the radiation diffracted by the mask at different mask positions.

4. The method of claim 1, wherein the scanning comprises using a broadband radiation.

5. The method of claim 1, wherein the scanning is done with radiation comprising wavelengths in extreme ultraviolet (EUV), soft X-Ray (SXR), and/or hard X-Ray (HXR).

6. The method of claim 1, wherein the radiation is generated using a high harmonic generation (HHG) process.

7. The method of claim 1, wherein the wavefront information has spatial resolution of sub-μm lateral resolution.

8. A method comprising:
scanning a moveable mask through a radiation;
detecting, using spectral resolution, patterns of the radiation scattered by the mask at different mask positions to obtain a measured data:
processing the measured data using a phase retrieval method; and
retrieving wavefront information of the radiation.

9. The method of claim 8, wherein the mask is mounted on a 2D scanning stage.

10. The method of claim 8, wherein the detected patterns are diffraction patterns of the radiation diffracted by the mask at the different mask positions.

11. The method of claim 8, wherein the scanning is done with radiation comprising wavelengths in extreme ultraviolet (EUV), soft X-Ray (SXR), and/or hard X-Ray (HXR).

12. The method of claim 8, wherein the radiation is generated using a high harmonic generation (HHG) process.

13. The method of claim 8, wherein the wavefront information has spatial resolution of sub-μm lateral resolution.

14. A method comprising:
scanning a moveable mask through a radiation;
detecting patterns of the radiation scattered by the mask at different mask positions to obtain a measured data;
processing the measured data using a phase retrieval method; and
retrieving wavefront information for each spectral component of the radiation.

15. A method to achieve an optimized mask design comprising:
scanning a moveable mask through a radiation, wherein the mask has predetermined wavefront and spectral sensitivity;
detecting patterns of the radiation scattered by the mask at different mask positions to obtain a measured data;
processing the measured data using a phase retrieval method; and
retrieving wavefront information of the radiation.

16. An assembly for obtaining a measured data, comprising:
a detector; and
a moveable mask, wherein the assembly is configured to receive broadband radiation, wherein the moveable mask is configured to move through the radiation, and wherein the detector is positioned to detect patterns of the radiation scattered by the mask at different mask positions to obtain the measured data.

17. A non-transitory computer program product comprising machine-readable instructions therein, the instructions, upon execution by a computer system, are configured to cause the computer system to at least cause performance of a method comprising:

scanning a moveable mask through a radiation;

detecting patterns of the radiation scattered by the mask at different mask positions to obtain a measured data;

processing the measured data using ptychography; and retrieving wavefront information of the radiation.

18. A processor and an associated storage medium, the storage medium comprising a non-transitory computer program of an assembly for retrieving wavefront information of a radiation with a measured data, comprising:

a detector; and a moveable mask, wherein the assembly is configured to receive the radiation, wherein the moveable mask is configured to move through the radiation, and wherein the detector is positioned to detect patterns of the radiation scattered by the mask at different mask positions to obtain the measured data;

wherein the processor is operable to perform a method comprising:

scanning the moveable mask through the radiation;

detecting patterns of the radiation scattered by the mask at different mask positions to obtain the measured data;

processing the measured data using ptychography; and retrieving wavefront information of the radiation.

19. A metrology device comprising:

an assembly configured to retrieve wavefront information of radiation using a phase retrieval method with a measured data, the assembly comprising:

a detector; and a moveable mask, wherein the assembly is configured to receive a radiation, wherein the moveable mask is configured to move through the radiation, and wherein the detector is positioned to detect patterns of the radiation scattered by the mask at different mask positions to obtain the measured data, and a processor and an associated storage medium of a non-transitory computer program product comprising machine-readable instructions therein, the instructions, upon execution by processor, are configured to cause the computer system to at least cause performance of the method comprising:

scanning the moveable mask through the radiation;

detecting patterns of the radiation scattered by the mask at the different mask positions to obtain the measured data;

processing the measured data using a phase retrieval method; and retrieving wavefront information of the radiation by:

scanning the moveable mask through the radiation;

detecting patterns of the radiation scattered by the mask at the different mask positions to obtain the measured data;

processing the measured data using ptychography; and retrieving wavefront information of the radiation.

* * * * *

UNITED STATES PATENT AND TRADEMARK OFFICE
CERTIFICATE OF CORRECTION

| | | |
|---|---|---|
| PATENT NO. | : 12,474,267 B2 | Page 1 of 1 |
| APPLICATION NO. | : 18/043794 | |
| DATED | : November 18, 2025 | |
| INVENTOR(S) | : Loetgering et al. | |

It is certified that error appears in the above-identified patent and that said Letters Patent is hereby corrected as shown below:

In the Claims

In Column 36, Claim 8, Line 30, delete "data:" and insert -- data; --, therefor.

In Column 37 , Claim 16, Lines 4-7, delete "wherein the detector is positioned to detect patterns of the radiation scattered by the mask at different mask positions to obtain the measured data." and insert the same at Line 5, as a new sub-point.

In Column 37, Claim 18, Line 35, delete "at different" and insert -- at the different --, therefor.

Signed and Sealed this
Twenty-third Day of December, 2025

John A. Squires
*Director of the United States Patent and Trademark Office*